(12) United States Patent
Steinbauer

(10) Patent No.: US 12,159,183 B2
(45) Date of Patent: Dec. 3, 2024

(54) APPARATUS AND METHOD FOR UNIQUE INDENTIFICATION OF AN OBJECT USING NEAR-FIELD COMMUNICATION (NFC)

(71) Applicant: LOFT LABS, LLC, New York, NY (US)

(72) Inventor: Martin Steinbauer, New York, NY (US)

(73) Assignee: Loft Labs, LLC, New York, NY (US)

( * ) Notice: Subject to any disclaimer, the term of this patent is extended or adjusted under 35 U.S.C. 154(b) by 0 days.

(21) Appl. No.: 18/211,726

(22) Filed: Jun. 20, 2023

(65) Prior Publication Data

US 2024/0119240 A1    Apr. 11, 2024

Related U.S. Application Data

(60) Provisional application No. 63/431,735, filed on Dec. 11, 2022.

(51) Int. Cl.

| | |
|---|---|
| *G06K 7/10* | (2006.01) |
| *A24F 40/40* | (2020.01) |
| *A24F 40/42* | (2020.01) |
| *A24F 40/50* | (2020.01) |
| *A24F 40/65* | (2020.01) |
| *B65D 83/72* | (2006.01) |
| *G05B 15/02* | (2006.01) |

(52) U.S. Cl.
CPC .......... *G06K 7/10297* (2013.01); *A24F 40/40* (2020.01); *A24F 40/42* (2020.01); *A24F 40/50* (2020.01); *A24F 40/65* (2020.01); *B65D 83/72* (2013.01); *G05B 15/02* (2013.01)

(58) Field of Classification Search
CPC .................................................. G06K 7/10297
See application file for complete search history.

(56) References Cited

U.S. PATENT DOCUMENTS

| | | |
|---|---|---|
| 10,959,459 B2 | 3/2021 | Sur |
| 11,510,040 B2 | 11/2022 | Kersey |

(Continued)

FOREIGN PATENT DOCUMENTS

WO    2022/013086 A1    1/2022

*Primary Examiner* — Sonji N Johnson
(74) *Attorney, Agent, or Firm* — Caldwell Intellectual Property Law

(57) ABSTRACT

An apparatus for unique identification of an object using near-field communication (NFC), the apparatus includes at least a processor and a memory, wherein the memory contains instructions configuring the at least a processor to receive object manufacture data associated with a first object containing an NFC tag, generate a unique identifier as a function of the object manufacture data, assign the unique identifier to the NFC tag of the first object using an NFC reader at an initial time, obtain first identification data containing the unique identifier when the NFC reader communicates with the NFC tag of the first object at a time subsequent to the initial time, aggregate the first identification data with second identification data associated with a second object using a data aggregator, determine an object action datum as a function of the aggregated identification data, and transmit the object action datum to the NFC reader.

20 Claims, 13 Drawing Sheets

(56) References Cited

U.S. PATENT DOCUMENTS

| | | | |
|---|---|---|---|
| 2013/0299569 A1* | 11/2013 | Gentile | G06Q 10/08 |
| | | | 235/375 |
| 2014/0355057 A1* | 12/2014 | Jang | G06K 7/10297 |
| | | | 358/1.15 |
| 2018/0173896 A1* | 6/2018 | Arneson | G06F 21/6254 |
| 2019/0158938 A1 | 5/2019 | Bowen et al. | |
| 2020/0315253 A1 | 10/2020 | Legendy | |
| 2021/0219608 A1 | 6/2021 | Carlberg et al. | |
| 2021/0350374 A1 | 11/2021 | Keen | |
| 2022/0095698 A1 | 3/2022 | Talbot et al. | |
| 2022/0180075 A1* | 6/2022 | Temkin | H04B 5/77 |
| 2022/0279860 A1 | 9/2022 | Stockall | |
| 2022/0398602 A1 | 12/2022 | Guo et al. | |

* cited by examiner

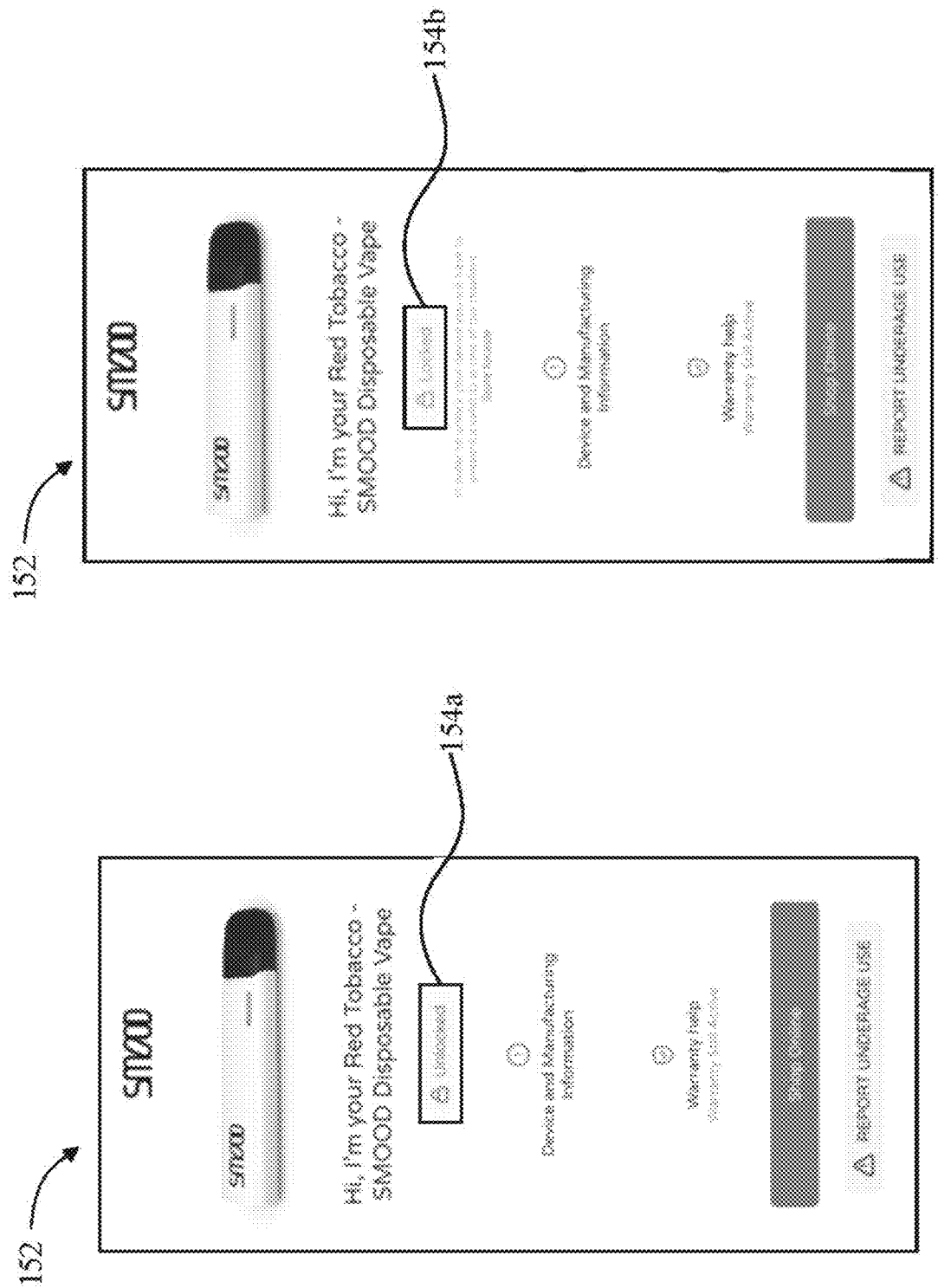

APPARATUS AND METHOD FOR UNIQUE INDENTIFICATION OF AN OBJECT USING NEAR-FIELD COMMUNICATION (NFC)

CROSS-REFERENCE TO RELATED APPLICATIONS

This application claims the benefit of priority of U.S. Provisional Patent Application Ser. No. 63/431,735, filed on Dec. 11, 2022 and titled "NFC-BASED CONTROL SYSTEM AND DATA SCHEMA FOR PRODUCT TRACEABILITY, AUTHENTICATION, PRODUCT RECALL, SALES REPORTING, THEFT PREVENTION, REGULATORY COMPLIANCE, AND CONSUMER ENGAGEMENT," which is incorporated by reference herein in its entirety.

FIELD OF THE INVENTION

The present invention generally relates to the field of unique identifiers. In particular, the present invention is directed to an apparatus and a method for unique identification of an object using near-field communication (NFC).

BACKGROUND

Although many methods of encoding object information exist ranging from electrical, optical, radio frequency, magnetic, audio, memory, and the like, they are either inefficient or expensive to implement for product tracing, product authentication, product recalling, sales report generation, theft prevention, regulatory compliance, consumer engagement and the like. Existing solutions to this problem are not sufficient.

SUMMARY OF THE DISCLOSURE

In an aspect, an apparatus for unique identification of an object using near-field communication (NFC) is described. The apparatus includes at least a processor and a memory communicatively connected to the at least a processor, wherein the memory contains instructions configuring the at least a processor to receive object manufacture data associated with a first object, wherein the first object contains an NFC tag, generate a unique identifier as a function of the object manufacture data, assign the unique identifier to the NFC tag of the first object using an NFC reader at an initial time, obtain first identification data containing the unique identifier when the NFC reader communicates with the NFC tag of the first object at a subsequent time, wherein the subsequent time occurs temporally after the initial time, aggregate the first identification data with second identification data associated with a second object using a data aggregator, and determine an object action datum as a function of the aggregated identification data, and transmit the object action datum to the NFC reader.

In another aspect, a method for unique identification of an object using near-field communication (NFC) is described. The method includes receiving, by at least a processor, object manufacture data associated with a first object, wherein the first object contains an NFC tag, generating, by the at least a processor, a unique identifier as a function of the object manufacture data, assigning, by the at least a processor, the unique identifier to the NFC tag of the first object using an NFC reader at an initial time, obtaining, by the at least a processor, first identification data containing the unique identifier when the NFC reader communicates with the NFC tag of the first object at a subsequent time, wherein the subsequent time occurs temporally after the initial time, aggregating, by the at least a processor, the first identification data with second identification data associated with a second object using a data aggregator, and determining, by the at least a processor, an object action datum as a function of the aggregated identification data, and transmitting, by the at least a processor, the object action datum to the NFC reader.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A-G are a series of screenshots illustrating exemplary embodiments of a visual interface;

DETAILED DESCRIPTION

At a high level, aspects of the present disclosure are directed to apparatus and methods for unique identification of an object using near-field communication (NFC). In an embodiment, object may include any object containing an NFC tag.

Aspects of the present disclosure can be used for end-to-end tracking of objects from manufacturing to sale. Aspects of the present disclosure can also be used to generate a unique identifier as a function of object manufacture data and assign the unique identifier to the NFC tag included in the object. This is so, at least in part, because NFC tag may include an NFC chip configured to communicate with the NFC reader, wherein the NFC reader may allow NFC data transmission at point-of-sale and/or point-of-manufacture.

Aspects of the present disclosure allow for monitoring locations and patterns of selling the objects. Exemplary embodiments illustrating aspects of the present disclosure are described below in the context of several specific examples.

Figure 1:
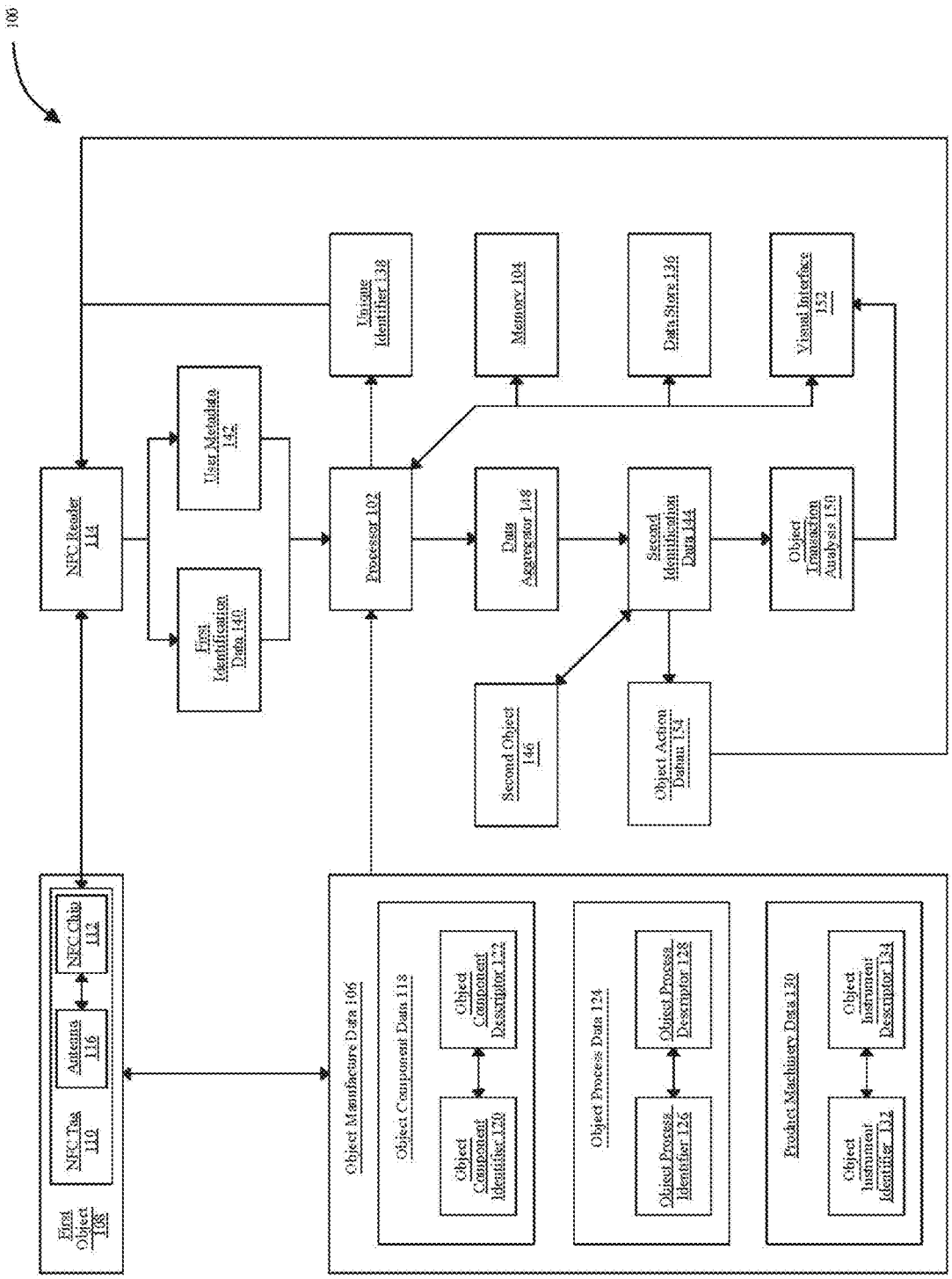
FIG. 1 is an exemplary embodiment of an apparatus for unique identification of an object using near-field communication (NFC)

Referring now to FIG. 1, an exemplary embodiment of an apparatus for unique identification of an object using near-field communication (NFC) is illustrated. System includes a processor 102 and a memory 104 communicatively connected to the processor 102. Processor 102 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented using a "shared nothing" architecture in which data is cached at the worker, in an embodiment, this may enable scalability of apparatus 100 and/or computing device.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, as used in this disclosure, a "object" is defined as any good comprising of one or more subcomponents that may include accessories and packaging that are being manufactured or sold by an entity. An "entity," for the purpose of this disclosure, is an independent and distinct existence such as a legal person. In some cases, legal person may include, without limitation, individual, group of individuals, trust, foundation, partnership, limited partnership, corporation, other business entity or firm, or the like thereof. In other cases, legal person may further include government such as, without limitation, municipality, state government, provincial government, departmental government, national or federal government, quasi-governmental organization, and/or the like thereof. In some embodiments, entity may include one or more sub-entities such as, without limitation, departments or divisions of entities described above. In a non-limiting example, object may include an aerosolization device (e.g., vape pen) sold by a retailer. Such object may be described in further detail below in reference to FIG. 2.

With continued reference to FIG. 1, apparatus 100 and methods described herein may perform or implement one or more methods of encoding information related to object. In some embodiments, methods of encoding information related to object may include, without limitation, electrical, optical, radio frequency, magnetic, audio, memory, and other methods; however, these methods of encoding information related to object are either inefficient or expensive to implement for object tracing, object authentication, object recalling, sales report generation, theft prevention, regulatory compliance, consumer engagement and the like. In a non-limiting example, lower cost or simple method of encoding information related to object using a bar code or a QR code may not be able to handle large quantities of information in the forms of encoded information useful for an object. In another non-limiting example, method of encoding information of object using printed batches may be too lengthy for bar codes or unreadable to the entity (i.e., human eyes) if using QR codes, each of which would have to change at every application. In a further non-limiting example, for object authentication using methods of encoding information related to product described above, bar code and/or QR code may be easy to replicate. Additionally, or alternatively, method of encoding information related to product electrically using specific pin layout and/or resistors may take a long time to be decoded. In other non-limiting examples, method of encoding information related to product using a Bluetooth low energy module may be too expensive and too advanced or use too much energy to be suitable for a supply chain tracking purpose. Further, accessing Information related to product in real-time may be difficult for audio-based systems (i.e., using speaker and/or mic) or magnetic systems (i.e., using swipe strip), especially on a repeated basis. On the other hand, method of encoding information related to product using near-field communication (NFC) technology may be simple, cost effective, and ubiquitously used for product tracking and tracing since NFC technology is similar to Radio-frequency identification (RFID) technology, wherein the NFC technology may use radio frequency to communicate; for instance, and without limitation, NFC may include a branch of High-Frequency (HF) RFID, operate at the 13.56 MHz frequency; however, NFC devices must be in close proximity to each other, usually no more than a few centimeters, whereas some RFIDs can communicate up to 100 meters. NFC may be described in further detail below.

With continued reference to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof, for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 102 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 102 is configured to receive object manufacture data 106 associated with a first object 108. First object may include any object described in this disclosure. First object 108 may include, but is not limited to, electrical product such as, without limitation, aerosol delivery device described in further detail below with reference to FIG. 2. First object 108 includes an NFC tag 110. As used in this disclosure, an "NFC tag" is a device configured to transmit and/or receive data at short range. In some embodiments, NFC tag 110 may include an NFC chip 112. As used in this disclosure, a "near field communication chip" is a component that enables a connected circuit to communicate with other devices, such as wirelessly, within a short range using near-field communication technology. Near-field communication technology may enable NFC chip 112 to execute a plurality of communication protocols that enables communication between two devices, such as, without limitation, first object 108 and NFC reader 114, over a distance of 4 cm (1.5 inches) or less. In some embodiments, NFC chip 112 may offer a low-speed connection used to bootstrap one or more wireless connection similar to proximity card technology; for instance, and without limitation, NFC tag 110 and/or NFC chip 112 may function as a smart card. Additionally, or alternatively, NFC tag 110 may further includes an antenna 116 communicatively connects to NFC chip 112. As used in this disclosure, an "antenna" is a device configured to convert voltage from a transmitter into a radio signal. Antenna 116 may pick radio signals out of the air and convert them into voltage for recovery in a receiver. In an embodiment, antenna may include a transducer. In some cases, a plurality of antennas may be connected to NFC chip 112 within NFC tag 110. In a non-limiting example, NFC chip 112 that is connected to two antennas may communicate with external device 132 in both directions using a frequency of 13.56 MHZ in globally available unlicensed radio frequency ISM band using ISO/IEC 18000-3 air interface standard at data rates ranging from 106 to 424 kbit/s. Further, NFC tag 110 and/or NFC chip 112 may be integrated/connected with a transmitter, a printed circuit board (PCB), or otherwise a "command center" of the first object 108; for instance, and without limitation, NFC chip 112 may be used in any of the following: coupled with PCB, integrated into object but not coupled with electronics, added as a sticker inside or outside of object, added to packaging of object, or added inside packaging on an insert card, and the like. In a non-limiting example, NFC chip may be consistent with any NFC chip described in in U.S. patent application Ser. No. 18/211,706, filed on Jun. 20, 2023, and titled "APPARATUS AND METHOD FOR AEROSOL DELIVERY," the entirety of which is incorporated by reference herein.

With continued reference to FIG. 1, as used in this disclosure, an "NFC reader" is an external device configured to communicate with NFC tag 110 as described above, wherein the external device is any device external to apparatus 100. In some embodiments, NFC reader 114 may support a plurality of radio-frequency (RF) protocols such as, without limitation, Zigbee, Bluetooth Low Energy, Wi-Fi, and the like thereof. In some embodiments, NFC reader 114 may initiate the communication; for instance, and without limitation, NFC reader 114 may send one or more commands to NFC chip 112 within NFC tag 110 within a distance via magnetic field such as, without limitation, command to write and/or read data stored in NFC chip 112. In other embodiments, NFC tag 110 may be configured to communicate with NFC reader 114 within a communication network. Communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. In some embodiments, NFC reader may use radio frequency identification (RFID) to communicate with NFC tag 110, wherein the RFID is a form of wireless communication that incorporates the use of electromagnetic or electrostatic coupling in the radio frequency portion of the electromagnetic spectrum to uniquely identify an object such as, without limitation, first object 108. In a non-limiting example, NFC reader 114 may be used to write generated unique identifier described below into NFC chip 112. NFC reader 114 may be consistent with any NFC reader described in U.S. patent application Ser. No. 18/211,706. At the point of sale, NFC reader 114 may be provided to authorized retailers to unlock an object with NFC tag 110 by placing the object near NFC reader 114. NFC reader 114 may read data stored in NFC chip 112 such as, without limitation, generated unique identifier. In some cases, NFC reader 114 may perform one or more commands if age verification was performed. As part of age verification, NFC reader 114 may save data encoded within NFC tag 110 and send the data to processor 102. First, this may allow for age verification at the point of sale to be enforced as company policy and/or government regulation. Secondly, this may allow for tracing objects in the supply chain, verifying authenticity of object vis-a-vis counterfeits, monitoring sales locations and sales behaviors, assisting in re-stocking of object at retail, providing data for consumer/patient behavior, and/or the like. More importantly, this may also allow objects that were sold to minors to be traced back to the retail location and the time of purchase. If this is a consistent pattern of underage usage, gathered data may be used by the retailer, the company, or the FDA to determine if a systemic underage sale problem exists and what action steps are best taken.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Further referring to FIG. 1, in some cases, processing circuit 124 may perform one or more signal processing steps on a signal. For instance, processing circuit 124 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, as used in this disclosure, "object manufacture data" is information related to object 108 and/or manufacture of the object 108. In an embodiment, object manufacture data 106 associated to object such as, without limitation, aerosol delivery device, may include information related to a plurality of components, wherein the plurality of components may include components made from different materials. Plurality of components may be manufactured by sub-contracted manufacturers before assembly. In a non-limiting example, components may include but not limited to components made from plastics, metals, chemicals, organic materials, or a composite thereof, for instance, and without limitation, electrical circuit, batteries, mechanical parts and the like. In another embodiments, object manufacture data 106 associated with pharmaceutical objects many include information related to a plurality of active ingredients that may be sourced from different suppliers at different times and batches.

With continued reference to FIG. 1, in a non-limiting example, object manufacture data 106 may include a plurality of object component data 118. As used in this disclosure, a "object component datum" is an element of data related to a single component of first object 108. In a non-limiting example, components of first object 108 such as aerosol delivery device may include outer body, mouthpiece, endcap, aerosolizable material reservoir, aerosolizable material, power source, heating element, and the like thereof. In some embodiments, each object component datum of plurality of object component data 118 may include an object component identifier 120 associated with an object component descriptor 122. As used in this disclosure, an "object component descriptor" is a data structure containing information describing the single component of first object 108. In some cases, object component descriptor 122 may include component name, component type, material name, and the like. In a non-limiting example, object component descriptor 122 may include a string describing a component and a main material of the component, such as, without limitation, "End Cap, Silicon" or "Silicon, End Cap." As used in this disclosure, a "object component identifier" is a sequence of characters (i.e., numbers, letters, special characters, and the like) used to identify or refer to a single component of first object 108. In some embodiments, object component identifier 120 may be manually assigned to object component descriptor 122 by the entity (e.g., manufacturer of components and/or materials of first object 108). In other embodiments, object component identifier 120 may be generated by processor 102 as a function of object component descriptor 122; for instance, and without limitation, object component identifier 120 may be generated using a lookup table, wherein the lookup table may correlate object component descriptor 122 and data elements thereof to a sequence of characters. Generating object component identifier 120 may include searching for object component descriptor 122 in order to find corresponding object component identifier 120. Additionally, or alternatively, object component identifier 120 may be in any length as long as such object component identifier 120 denotes the unique nature of components of first object 108 and is simple for users to comprehend and/or transcribe. Continuing the non-limiting example, object component identifier 120 associated with object component descriptor 122 of "Silicon, End Cap" may include a sequence of characters such as, without limitation, "SLC-04," wherein sub-sequence "SLC" may represent object material "Silicon," and "-04" may represent object component "End Cap."

With continued reference to FIG. 1, in another non-limiting example, object manufacture data 106 may include a plurality of object process data 124. As used in this disclosure, a "object process datum" is an element of data related to the process of manufacture and/or sale of first object 108. In a non-limiting example, data related to the manufacturing process of first object 108 may include information of place of manufacture, name of manufacture facility, production lines, production batches, components placement, and the like. In another non-limiting example, data related to the sale process of first object 108 may include information of intended shipment route, shipment method, name of shipping facility, object description, SKU name, and the like thereof. In some embodiments, each object process datum of plurality of object process data 124 may include an object process identifier 126 associated with an object process descriptor 128. As used in this disclosure, an "object process descriptor" is a data structure containing information describing the process of manufacture and/or sale of first object 108. In a non-limiting example, object process descriptor 128 may include a string describing a place of manufacture and a name of manufacture facility of first object 108, such as, without limitation, "Guangzhou, GNZ" or "GNZ, Guangzhou." As used in this disclosure, a "object process identifier" is a sequence of characters (i.e., numbers, letters, special characters, and the like) used to identify or refer to the process of manufacture and/or sale of first object 108. In some embodiments, object process identifier 126 may be manually assigned to object process descriptor 128 by the entity (e.g., manufacture facility, shipping facility, retailer, and the like). In other embodiments, object process identifier 126 may be generated by processor 102 as a function of object process descriptor 128; for instance, and without limitation, object process identifier 126 may be generated using a lookup table, wherein the lookup table may correlate object process descriptor 128 and data elements thereof to a sequence of characters. Generating object process identifier 126 may include searching for object process descriptor 128 in order to find corresponding object process identifier 126. Additionally, or alternatively, object process identifier 126 may be in any length as long as such object process identifier 126 denotes the unique nature of the process of manufacture and/or sale of first object 108 and is simple for users to comprehend and/or transcribe. Continuing the non-limiting example, object process identifier 126 associated with object process descriptor 128 of "Guangzhou, GNZ" may include a sequence of characters such as, without limitation, "518-GNZ," wherein sub-sequence "518" may represent place of manufacture "Guangzhou," and "GNZ" may represent name of manufacture facility "GNZ."

With continued reference to FIG. 1, in a further non-limiting example, object manufacture data 106 may include a plurality of object instrument data 130. As used in this disclosure, a "object instrument datum" is an element of data related to the machine used during the process of manufacture and/or sale of first object 108. In a non-limiting example, data related to the machine used during the process of manufacture and/or sale of first object 108 may include information of filling machine model, puff sensor machine model, NFC reader model, and the like thereof. In some embodiments, each object instrument datum of plurality of object instrument data 130 may include an object instrument identifier 132 associated with an object instrument descriptor 134. As used in this disclosure, a "object instrument descriptor" is a data structure containing information describing the machine used during process of manufacture and/or sale of first object 108. In a non-limiting example, object instrument descriptor 134 may include a string describing the model of filling machine and puff sensor machine used during first object 108 manufacturing, and model of NFC reader provided to the retailer, such as, without limitation, "filling machine model 1, puff sensor machine model 2, NFC reader model 3." As used in this disclosure, a "object instrument identifier" is a sequence of characters (i.e., numbers, letters, special characters, and the like) used to identify or refer to the machine used during the process of manufacture and/or sale of first object 108. In some embodiments, object instrument identifier 132 may be manually assigned to object instrument descriptor 134 by the entity (e.g., manufacturer of the machines). In other embodiments, object instrument identifier 132 may be generated by processor 102 as a function of object instrument descriptor 134; for instance, and without limitation, object instrument identifier 132 may be generated using a lookup table, wherein the lookup table may correlate object instrument descriptor 134 and data elements thereof to a sequence of characters. Generating object instrument identifier 132 may include searching for object instrument descriptor 134 in order to find corresponding object instrument identifier 132. Additionally, or alternatively, object instrument identifier 132 may be in any length as long as such object instrument identifier 132 denotes the unique nature of the machine used during the process of manufacture and/or sale of first object 108 and is simple for users to comprehend and/or transcribe. Continuing the non-limiting example, object instrument identifier 132 associated with object instrument descriptor 134 of "filling machine model 1, puff sensor machine model 2, NFC reader model 3" may include a sequence of characters such as, without limitation, "001-002-003," wherein sub-sequence "001" may represent the model number of the filling machine, "002" may represent the model number of the puff sensor machine, and "003" may represent the model number of the NFC reader.

With continued reference to FIG. 1, processor 102 may be configured to store object manufacture data 106, such as, without limitation, plurality of object component data 118, plurality of object process data 124, plurality of object instrument data 130, and the like thereof to a data store 136. In an embodiment, data store 136 may include a database. In some embodiments, a "data store" may be referred to as a "database." Data store 136 may be implemented, without limitation, as a relational database, a key-value retrieval database such as a NOSQL database, or any other format or structure for use as a database that a person skilled in the art would recognize as suitable upon review of the entirety of this disclosure. Data store 136 may alternatively or additionally be implemented using a distributed data storage protocol and/or data structure, such as a distributed hash table or the like. Data store 136 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

With continued reference to FIG. 1, processor 102 is configured to generate a unique identifier (ID) 138 as a function of object manufacture data. As used in this disclosure, a "unique identifier" is an element of data that uniquely identifies an object. For example, without limitation, first object 108. In an embodiment, unique ID 138 may include a sequence of numbers. In another embodiment, unique ID 138 may include a combination of numbers, letters, and/or special characters. In some embodiments, unique ID 138 may be generated by processor 102 and/or any other computing device after the production of first object 108. Unique ID 138 may encode at least a portion of object manufacture data 106 described above; for instance, and without limitation, processor 102 may be able to obtain at least a portion of object manufacture data 106 of an object by scanning, processing, or otherwise decoding unique ID 138 associated with the object. In some embodiments, unique ID 138 may be generated in compliance with quality management system such as ISO or mandated by regulation such as EU Regulation 2018/574. Regulations may require manufacturers to encode each object with the below information, in terms of a serial number printed onto the packaging. As this is very inefficient to be human readable or even scannable in the form of a bar code as it could be replicated with an NFC solution with the unique ID encoding system could improve this by 1) automating the encoding system with more and better data; 2) decrease the likelihood of tampering; and 3) allow for changes in the encoding system rapidly. In a non-limiting example, an encoding system for an NFC may be as follows, following EU Regulation 2018/574 guidelines: b) an alphanumeric sequence, whose probability to be guessed shall be negligible and in any case lower than one in ten thousand ('serial number'); (c) a code ('product code') allowing for the determination of the following: the place of manufacturing, the manufacturing facility referred to in Article 16, the machine used to manufacture the tobacco products referred to in Article 18, the product description, the intended market of retail sale, the intended shipment route, where applicable, the importer into the Union; and (d) in the last position, the time stamp in the form of a numeric sequence of eight characters, in the format "YYMMDDhh," indicating the date and time of manufacture. Further, for pharmaceutical products or for products regulated by the Food and Drug Administration, FDA may require material traceability such as tracing the production date, IQC report, in/out factory date, etc. of each component, and testing report and record of each product in factory through unique ID 138 of each product, which includes date code, model number and serial number. Object manufacture data 106 may be adapted to include any of these requirements for such unique ID 138 generation.

With continued reference to FIG. 1, in a non-limiting example, after quality control and puff sensor machine testing during production, processor 102 may generate a unique ID using plurality of object component data 118, plurality of process data 124, and/or plurality of object instrument data 130. Generating the unique ID may include combining at least a portion of object component identifiers 120, at least a portion of object process identifiers 126, and/or at least a portion of object instrument identifiers 132 in certain order; for instance, and without limitation, object manufacture data of an object may include a plurality of object component data: "<A1, x1>, <A2, x2>, <A3, x3>," wherein each object component datum may be in form of vector, and wherein A1-3 may be object component descriptors and x1-3 may be corresponding object component identifiers. Object manufacture data of the object may include a plurality of object process data: "<B1, y1>, <B2, y2>, <B3, y3>, <B4, y4>, <B5, y5>," wherein each object process datum may be in form of vector, and wherein B1-5 may be object process descriptors and y1-5 may be corresponding object process identifiers. Object manufacture data of the object may include a plurality of object instrument data: "<C1, z1>, <C2, z2>, <C3, z3>," wherein each object instrument datum may be in form of vector, and wherein C1-3 may be object instrument descriptors and z1-3 may be corresponding object instrument identifiers. Processor 102 may be configured to generate unique ID 138 by combining object component identifiers, object process identifiers, and/or object instrument identifiers in a predefined order; for example, and without limitation, unique ID 138 generated based on above object manufacture data may be "y1y2y3y4y5-z1z2z3-x1x2x3." Additionally, or alternatively, generating unique ID 138 may further include hashing the combined object component/process/instrument identifiers by processor 102; for instance, and without limitation, using one or more hashing algorithms described above. In some cases, hashing algorithms may include, without limitation, identity hashing, trivial hashing, folding, division hashing, algebraic coding, unique permutation hashing, multiplicative hashing, Fibonacci hashing, Zobrist hashing, middle and ends hashing, character folding, word length folding, radix conversion hashing, rolling hashing, and the like. In a non-limiting example, hashing the combined object component/process/instrument identifiers may include using one-way hashing algorithm described above. Processor 102 may be configured to add a salt to one-way hashing algorithm that hashes combined object component/process/instrument identifiers, wherein the salt is a random additional input to hashing algorithm. For instance, and without limitation, salt may include a production timestamp of first object 108 in "YYMMDDhh" format.

With continued reference to FIG. 1, processor 102 is configured to assign unique ID 138 to NFC tag 110 using NFC reader 114 at an initial time. As used in this disclosure, an "initial time" refers to a first time NFC tag 110 communicates with NFC reader 114. Communication may be bidirectional; for instance, and without limitation, NFC reader may read, write, or otherwise re-write data from/to the NFC tag 110. NFC tag 110 may send or transmit data to NFC reader 114. In some cases, initial time may include a time after production. In some embodiments, assigning unique ID 138 may include enabling a communication between NFC reader 114 and NFC tag 110 by processor 102; for instance, and without limitation, processor 102 may configure NFC reader 114 to active antenna 116 connected to NFC chip 112 within NFC tag 110 by sending specific radio waves. NFC reader 114 may communicate with NFC tag 110 over radio waves and/or exchange information such as, without limitation, unique ID 138, first identification data 140, and the like in an NFC data exchange format (NDEF). As used in this disclosure, an "NFC data exchange format" is a standardized data format that can be used to exchange information between any compatible NFC device and another NFC device or tag. In some embodiments, NDEF format may include NDEF messages and/or NDEF records. NEDF format may be used to store and exchange information like URLs, plain text, and the like between tow active NFC devices in "peer-to-peer" mode. In a non-limiting example, processor 102 may configure NFC reader 114 to transmit a command of writing generated unique ID 138 to NFC chip 112 of NFC tag 110 in NDEF format. By adhering to NDEF data exchange format during communication, NFC tag 110 and NFC reader 114 that would otherwise have non meaningful knowledge of each other, or common language may be able to share data such as, without limitation, unique ID 138, first identification data 140, and the like in an organized, mutually understandable manner. First identification data 140 disclosed here may be described in further detail below in this disclosure.

With continued reference to FIG. 1, in some embodiments, NFC tag 110 may include an NFC tag type. As used in this disclosure, "NFC tag type" is a type of NFC Forum data format. In some embodiments, NFC tag type may be defined based on International Organization for Standardization (ISO) standards. In some cases, NFC tag type may include a first tag type (i.e., NFC_FORUM_TYPE_1), wherein the first tag type may be based on the ISO14443A standard. NFC tag with first tag type may be capable of reading and writing (or re-writing) data from or on to NFC chip 112. User may be able to configure NFC tag with first tag type to become read-only. NFC tag with first tag type may include a memory availability of 96 bytes for storing data such as, without limitation, a website URL or other small amount of data; however, the memory size may be expandable up to 2 Kbyte. Communication speed of NFC tag with first tag type may be 106 kbit/s. In some cases, NFC tag type may include a second tag type (i.e., NFC_FORUM_TYPE_2), wherein the second tag type may be the same as first tag type except a reduced basic memory size; for instance, and without limitation, NFC tag with second tag type may be read and write (or re-write) capable with the same communication speed of 106 kbit/s, and user may be able to configure the NFC tag to become read-only; however, the basic memory size may be only 48 bytes. Similarly, the memory size of NFC tag with second tag type may be expandable up to 2 Kbyte. In some cases, NFC tag type may include a third tag type (i.e., NFC_FORUM_TYPE_3), wherein the third tag type may be based on the SONY FELICA system. NFC tag with third tag type may include a memory size of 2 Kbyte and data communication speed of 212 kbit/s. Such NFC tag may be more applicable for more complex applications, although there is a higher cost per tag. In other cases, NFC tag type may include a fourth tag type (i.e., NFC_FORUM_TYPE_4), wherein the fourth tag type may be defined to be compatible with both ISO 14443A and B standards. NFC tag with fourth tag type may be preconfigured at manufacture; for instance, and without limitation, such NFC tag may be either read, writable/re-writable, or read-only. NFC tag with fourth tag type may include a memory size up to 32 Kbytes and data communication speed ranging from 106 kbit/s to 424 kbit/s. Additionally, or alternatively, NFC tag type may include a fifth tag type, wherein the fifth tag type may include a passive high frequency HF RFID tag which complaint with ISO/IEC 15693. In a non-limiting example, processor 102 may generate object component identifier 120, object process identifier 126, and/or object instrument identifier 132 of each component batch as part of the unique ID 138 for each object at point of manufacturing. NFC tag 110 may include an NFC tag with fourth tag type; for instance, and without limitation, NFC tag 110 of first object 108 (e.g., an aerosol delivery device) may include an NFC chip that is capable of encoding up to 800 digits. NFC tag with fourth tag type may be made according to ISO/IEC14443 and may be a protocol NFC dual interface smart tag chip, with a built in MCU. The contactless interface of NP04 may conform to the standard NFC TAG of NFC FORUM TYPE2; and may be used to write the website URL, object introduction, unique ID 138, information for advertising oriented to consumers, and the like thereof.

With continued reference to FIG. 1, processor 102 is configured to obtain first identification data 140 containing unique ID 138 when NFC reader 114 communicates with NFC tag 110 of first object 108 at a time subsequent to initial time. As used in this disclosure, "identification data" is data that uniquely identifies an object and/or a user of the object. For instance, and without limitation, identification data may include any identification data described in U.S. patent application Ser. No. 18/211,706. "First identification data," for the purpose of this disclosure, is data that uniquely identifies first object 108 and/or a user of first object 108. In a non-limiting example, first object 108 may include first identification data 140 associated therewith and another object may include another identification data associated therewith that contains at least a portion of different identification data, although both objects may be manufactured by a same manufacturer. In some embodiments, first identification data 140 may include, without limitation, production timestamp, production line serial number, device serial number, device ID, batch number, unique ID 138, object manufacture data 106, and the like thereof. In other embodiments, first identification data 140 may include user metadata 142. As used in this disclosure, "user metadata" is data that provides information about user of an object, such as, without limitation, first object 108. In some cases, user may include a buyer of first object 108 who purchased first object 108 from a retailer. In other cases, user may include retailer who stock first object 108 from a supplier (such as a vendor). In some embodiments, user metadata 142 may be received, obtained, or otherwise gathered, by processor 102, from the user at the time of purchasing (i.e., time subsequent to initial time). User metadata 142 may include, without limitation, purchase timestamp, name, address, email address, date of birth, user identification, and the like thereof. In a non-limiting example, user metadata 142 within first identification data 140 associated with first object 108 may be generated, by processor 102, as a function of the transaction; for instance, and without limitation, user metadata 142 may be obtained from payment and/or ID verification during the transaction. In some embodiments, obtaining first identification data 140 may include reading data stored on NFC tag 110 using NFC reader 114; for instance, and without limitation, NFC reader 114 may be configured by processor 102 to read unique ID 138 encoded into NFC chip 112 of NFC tag 110. In other embodiments, obtaining first identification data 140 may further include receiving user metadata 142 from NFC reader 114. In a non-limiting example, at the point of sale, an NFC reader may be provided to authorized retailers that have to tap first object 108 by placing first object 108 near the NFC reader. In some cases, NFC reader 114 may include an integrated ID reader configured to read user ID such as, without limitation, state identification card, driver license, passport, and the like thereof. ID reader may generate user metadata 142 by scanning provided user ID. In other cases, there may be integrations with third party payment systems that have an integrated NFC reader already and going through the same steps of tapping first object 108 onto the Point-of-Sale Systems NFC reader for a similar outcome. NFC reader may save first identification data 140 including, without limitation, unique ID 138, user metadata 142, and/or the like, and sends first identification data 140 to processor 102. Additionally, or alternatively, first identification data 140 may be encrypted, by processor 102, in one or more ways described above in reference to the cryptographic system. In a non-limiting example, processor 102 may encrypt first identification data 140 into one or more hashes through hash algorithms as described above. Further, first identification data 140 obtained by processor 102 may be stored in data store 136 as described above.

With continued reference to FIG. 1, in some embodiments, obtaining first identification data 140 may include posting, by processor 102, first identification data 140 such as, without limitation, user metadata 142, unique ID 138, and the like to an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. In a non-limiting example, processor 102 may generate a data entry on a decentralized platform, wherein the block may be configured to store unique ID 138 associated with first object 108. A "decentralized platform," as described herein, is a platform or server that enables secure data exchange between anonymous parties. Decentralized platform may be supported by any blockchain technologies. For example, and without limitation, blockchain-supported technologies can potentially facilitate decentralized coordination and alignment of human incentives on a scale that only top-down, command-and-control structures previously could. Decentralized platform may serve as an ecosystem for decentralized architectures such as immutable sequential listing and/or blockchain. In a non-limiting example, processor 102 may generate a block configured to store unique ID 138 associated with first object 108 and post the block to immutable sequential listing. Unique ID 138 associated with first object 108 may be stored in the block may be retrieved, by processor 102 and/or any other computing device, from immutable sequential listing; however, processor 102 and/or any other computing device may not change, modify, or otherwise update unique ID associated with first object 108 in any way.

With continued reference to FIG. 1, processor 102 is configured to aggregate first identification data 140 with second identification data 144 associated with a second object 146 using data aggregator 148. As used in this disclosure, "second identification data" is data that uniquely identifies second object 146 and/or a user of second object 146. In some cases, second object 146 may include any object described in this disclosure. In some embodiments, second object 146 may include a plurality of objects, wherein the plurality of objects may include objects with NFC tag 110 that already read by NFC reader 114 at time subsequent to initial time. In a non-limiting example, second object 146 may include plurality of objects sold by the retailer. Second identification data 140 may include identification data associated with second object 146; for instance, and without limitation, identification data obtained by processor 102 at time of sale of second object 146 via NFC reader 114. Second identification data 144 may include identification data stored in data store 136 and/or immutable sequential listing prior to obtaining first identification data 140 as described above. As used in this disclosure, to "aggregate" means to combine, append, or otherwise composite first identification data 140 and second identification data 144 using data aggregator 148. As used in this disclosure an "data aggregator" is a component designed to collect data from one or more sources. In some embodiments, data aggregator 148 may include a computer program or a piece of a computer program. In a non-liming example, data aggregator 148 may be configured to collect first identification data 140 saved in NFC reader 114 and second identification data 144 stored in data store 136. Data aggregator 148 may be configured to combine collected data such as, without limitation, first identification data 140 and second identification data 144, and store the combined data into one or more data source, such as, without limitation, data store 136, immutable sequential listing, and the like. In some embodiments, data aggregator 148 may include a statistical component, wherein the statistical component may be configured to perform statistical analysis on collected data. Statistical analysis may include, without limitation, descriptive statistical analysis, inferential statistical analysis, associational statistical analysis, predictive analysis, prescriptive analysis, exploratory data analysis, causal analysis, and the like to first identification data 140, second identification data 144, and/or combination of both. Statistical analysis may be performed through one or more statistical analysis process implemented by statistical component such as, without limitation, data collection, data organization, data presentation, data analysis, data interpretation, and the like. Statistical analysis may be performed using one or more statistical analysis method, such as, without limitation, sum, mean, standard deviation, regression, hypothesis testing and the like thereof. Person skilled in the art would recognize various statistical analysis, statistical analysis process, and statistical analysis method described herein upon review of the entirety of this disclosure.

With continued reference to FIG. 1, in some embodiments, aggregating first identification data 140 with second identification data 144 may include generating an object transaction analysis 150 as a function of aggregated identification data. As used in this disclosure, a "object transaction analysis" is a detailed examination of information within the aggregated identification data. In some embodiments, object transaction analysis may include one or more statistical reports of object related information from manufacturing to sale. In a non-limiting example, object transaction analysis 150 may be generated using data aggregator 148; for instance, and without limitation, data aggregator 148 may calculate one or more measurements regarding to sales of objects, such as total revenue, total units sold, active stores, unique purchases, and the like using statistical component described above. In some embodiments, object transaction analysis may include one or more visualization of aggregated identification data. Visualization of aggregated identification data may include, without limitation, object image, object components image, statistical graph, chart, table, and the like thereof. In a non-limiting example, object transaction analysis generated by data aggregator 148 may include a line graph depicting total revenue for the previous week, month, quarter, year, and the like. Aggregating first identification data 140 with second identification data 144 may further include displaying object transaction analysis 150 through a visual interface 152. A "visual interface," as used in this disclosure, is a graphical user interface (GUI) that displays aggregated identification data, object transaction analysis 150, and the like, as defined below to an entity of a remote device and permits entity to manipulate, edit, or otherwise interact with data obtained and/or aggregated by data aggregator 148. Visual interface 152 may include a window in which aggregated identification data and/or object transaction analysis 150 may be displayed. Visual interface 152 may include one or more graphical locator and/or cursor facilities allowing entity to interact with aggregated identification data and/or object transaction analysis 150; for instance, and without limitation, using a touchscreen, touchpad, mouse, keyboard, and/or other manual data entry device. Visual interface 152 may include one or more menus and/or panels permitting selection of measurements, models, visualization of data to be displayed and/or used, elements of data, functions, or other aspects of object transaction analysis 150 to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which a visual interface and/or elements thereof may be implemented and/or used as described in this disclosure.

With continued reference to FIG. 1, additionally, or alternatively, data aggregator 148 may utilize a machine-learning module to determine one or more measurements regarding to sales of object such as, without limitation, production prediction, revenue prediction, restock needs prediction, and the like thereof. However, such measurements may also be determined without using machine-learning module. In a non-limiting example, processor 102 may use a machine learning module, such as object replenishment machine-learning module, to implement one or more algorithms or generate one or more machine-learning models, such as object replenishment machine-learning model, to determine a replenishment demand datum of a given retailer. As used in this disclosure, a "replenishment demand datum" is an element of data containing information related to the given retailer's restock needs. For example, and without limitation, replenishment demand datum may include, without limitation, restocking timestamp, quantities of object to be restocked, and the like thereof. Replenishment demand datum may also be determined, by processor 102, based on data such as retailer's current and/or historical inventory information, weekly/monthly sales, and the like of object without using machine-learning module; for instance, and without limitation, replenishment demand datum of an object may include quantities of object to be restocked that matches with last month sales of the object. However, the machine-learning module is exemplary and may not be necessary to generate one or more machine-learning models and perform any machine-learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from data store 136, such as any database described in this disclosure, or be provided by entity. In other embodiments, a machine-learning module may obtain a training set by querying a communicatively connected data store 136 that includes past inputs and outputs. Training data may include inputs from various types of data stores, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Object replenishment machine-learning module may be used to generate object replenishment model and/or any other machine-learning models using training data. object replenishment model may be trained by correlated inputs and outputs of training data. Training data may be data sets that have already been converted from raw data whether manually, by machine, or any other method. Training data may include previous outputs such that object replenishment model iteratively produces outputs. Object replenishment model using a machine-learning process may output converted data based on input of training data. In an embodiment, aggregating first identification data 140 with second identification data 144 may include determining, by processor 102, a replenishment demand datum based on aggregated identification data using a machine-learning model, such as object replenishment machine-learning model generated by object replenishment machine-learning module. Object replenishment machine-learning model may be trained using object replenishment training data, wherein the object replenishment training data may include a plurality of identification data obtained from a given retailer as input correlated to a plurality of replenishment demand data as output. Determining replenishment demand datum may further include determining replenishment demand datum using trained object replenishment machine-learning model.

With continued reference to FIG. 1, processor 102 is configured to determine an object action datum 154 as a function of aggregated identification data. As used in this disclosure, a "object action datum" is an element of data describing an action that needs to be taken on at least a portion of aggregated identification data. In a non-limiting example, action may include locking/unlocking one or more objects. In a non-limiting example, determining the object action datum may include verifying first identification data 140 and generating a verification datum as a function of first identification data 140. First identification data 140 may be verified, by processor 102, against second identification data 144; for instance, and without limitation, second identification data 144 may include a pre-saved unique ID after manufacture of first object 108 prior to the sale. Unique ID within first identification data 140 may be compared to the pre-saved unique ID to determine if first object 108 is genuine. As used in this disclosure, a "verification datum" is an element of data representing a result of data verification. Data verification may include, without limitation, age verification, user identity verification, device authentication, and the like thereof. In some cases, verification datum may include a data structure containing values representing yes-or-no answers; for instance, and without limitation, verification datum may include value in Boolean data type such as "TRUE" or "FALSE." In some embodiment, processor 102 may compare user metadata 142 within first identification data 140 such as, without limitation, user's date of birth, calculating a current age of the users, and compare the current age with an age threshold such as, without limitation, value of 21. Processor 102 may generate a verification datum of "TRUE" if current age exceeds age threshold. On the other hand, processor 102 may generate a verification datum of "FALSE" if current age is below age threshold. Such verification datum may be used to determine objection action datum 154; for instance, and without limitation, object action datum 154 may be "unlocking the object" if verification datum includes a value of "TRUE," while object action datum 154 may be "locking the object" if verification datum includes a value of "FALSE." In another non-limiting example, processor 102 may verify first identification data 140 against second identification data 144; for instance, and without limitation, second identification data 144 may include baseline identification data. Baseline identification data may include a plurality of qualified object metric for objects manufactured in the same batch of first object 108 such as, without limitation, device and/or E-liquid expiration date, E-liquid composition, material used during manufacture of each component, battery life, and the like thereof. Processor 102 may compare first identification data 140 such as, without limitation, E-liquid composition with baseline E-liquid composition specified in baseline identification data. Processor 102 may generate a verification datum of "TRUE" if E-liquid composition matches with baseline E-liquid composition. On the other hand, processor 102 may generate a verification datum of "FALSE" if E-liquid composition mismatches with baseline E-liquid composition. Processor 102 may then determine an object action datum 154 based on such verification datum; for instance, and without limitation, object action datum 154 may be "recall the object" if verification datum includes a value of "FALSE," while object action datum 154 may be "available for sale" if verification datum includes a value of "TRUE." In a further non-limiting example, object action datum 154 may be consistent with any external response described in U.S. patent application Ser. No. 18/211,706. Additionally, or alternatively, object action datum 154 may be determined by the entity; for instance, and without limitation, entity may include manufacturer, retailer, user, and/or the like. Additionally, or alternatively, object action datum 154 may be determined and/or received from government facilities such as, without limitation, through law enforcement, Food and Drug Administration (FDA), and the like. In a non-limiting example, object action datum 154 may be determined as a function of FDA Food code.

With continued reference to FIG. 1, processor 102 may be further configured to transmit object action datum 154 to NFC reader 114. In some embodiments, NFC reader 114 may save object action datum 154 and send object action datum 154 to NFC tag 110 in communication. In a non-limiting example, transmitting object action datum 154 may include applying object action datum 154 to NFC tag 110 using NFC reader 114; for instance, NFC chip 112 may be coupled with the PCB of an electronics object and steer the "on"/"off" functionality. NFC chip 112 of NFC tag 110 that may be communicatively connected to a microcontroller of the aerosol delivery device may receive object action datum 154 of "locking/unlocking the device." The microcontroller connected to the NFC chip 112 may be triggered to lock/unlock the device in response to received object action datum 154. In another non-limiting example, in the case of object action datum 154 contains "recall the device;" for instance, a Manufacturing Facility (VTA) produced a defective batch on a specific date and time of manufacture (22120612), a command may be given from processor 102 to not unlock any devices with VTA+22120612 as part of their unique ID 138. NFC reader 114 may not be allowed to unlock the device, and/or a recall message may be shown to the clerk upon checkout. Method for controlling usability of object may be consistent with any methods described in in U.S. patent application Ser. No. 18/211,706. In another non-limiting example, NFC tag 110 of first object 108 may communicate with a phone NFC reader; for instance, and without limitation, NFC reader 114 may include a phone NFC reader, wherein the phone NFC reader may transmit object action datum 154 containing information regarding to object recycling. In some cases, object action datum 154 may be embedded in a URL. In such embodiment, entity may find recycling boxes hosted at retail locations or order a recycling bag for DTC recycling according to such object action datum 154. In some cases, recycling boxes may include a QR code or another NFC reader. Entity may scan OR code using a user device or tap first object 108 on NFC reader. In such embodiment, object action datum 154 may include a reward to the entity, determined by processor 104, as a function of the object manufacture data 106 of first object 108, wherein the reward may include, without limitation, a predetermined amount of currency (i.e., cryptocurrency) as described in further detail as reference to FIG. 4. Additionally, or alternatively, reward may include local currency (i.e., dollar) from retailer. In some embodiments, entity may use the reward to exchange second object 146.

Figure 2:
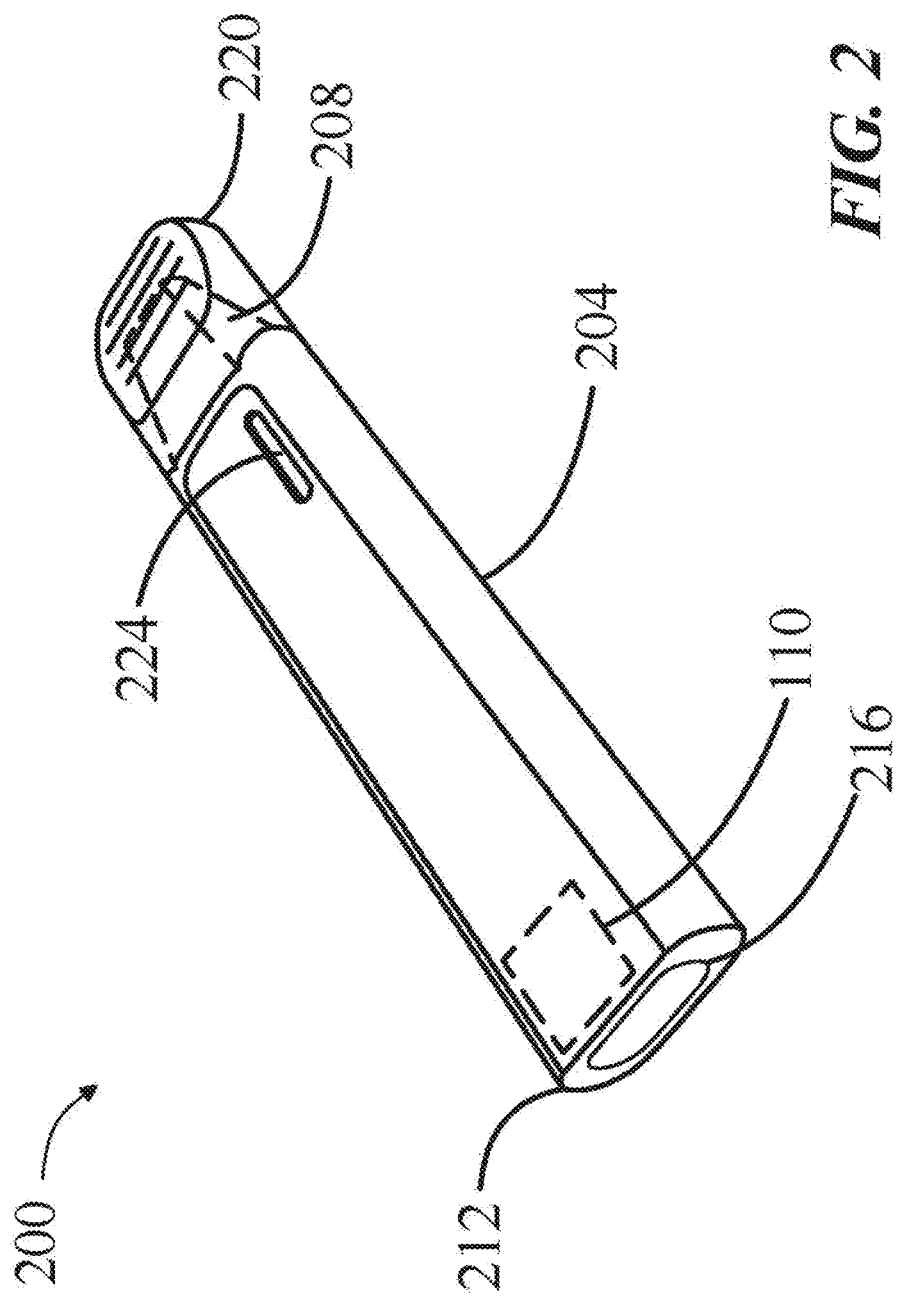
FIG. 2 is an exemplary embodiment of an object containing an NFC tag.
Figure 3A:
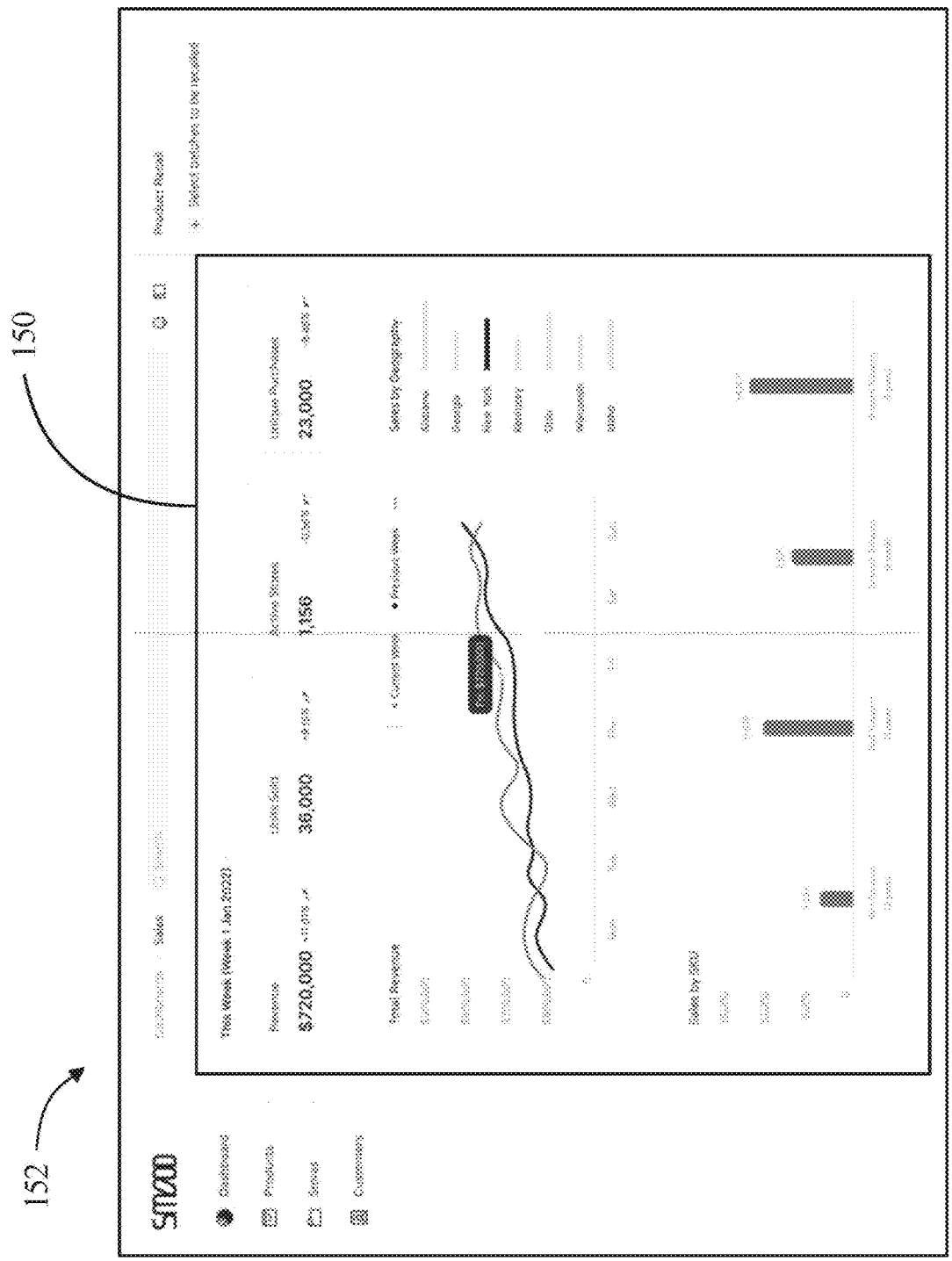
Figure 3B:
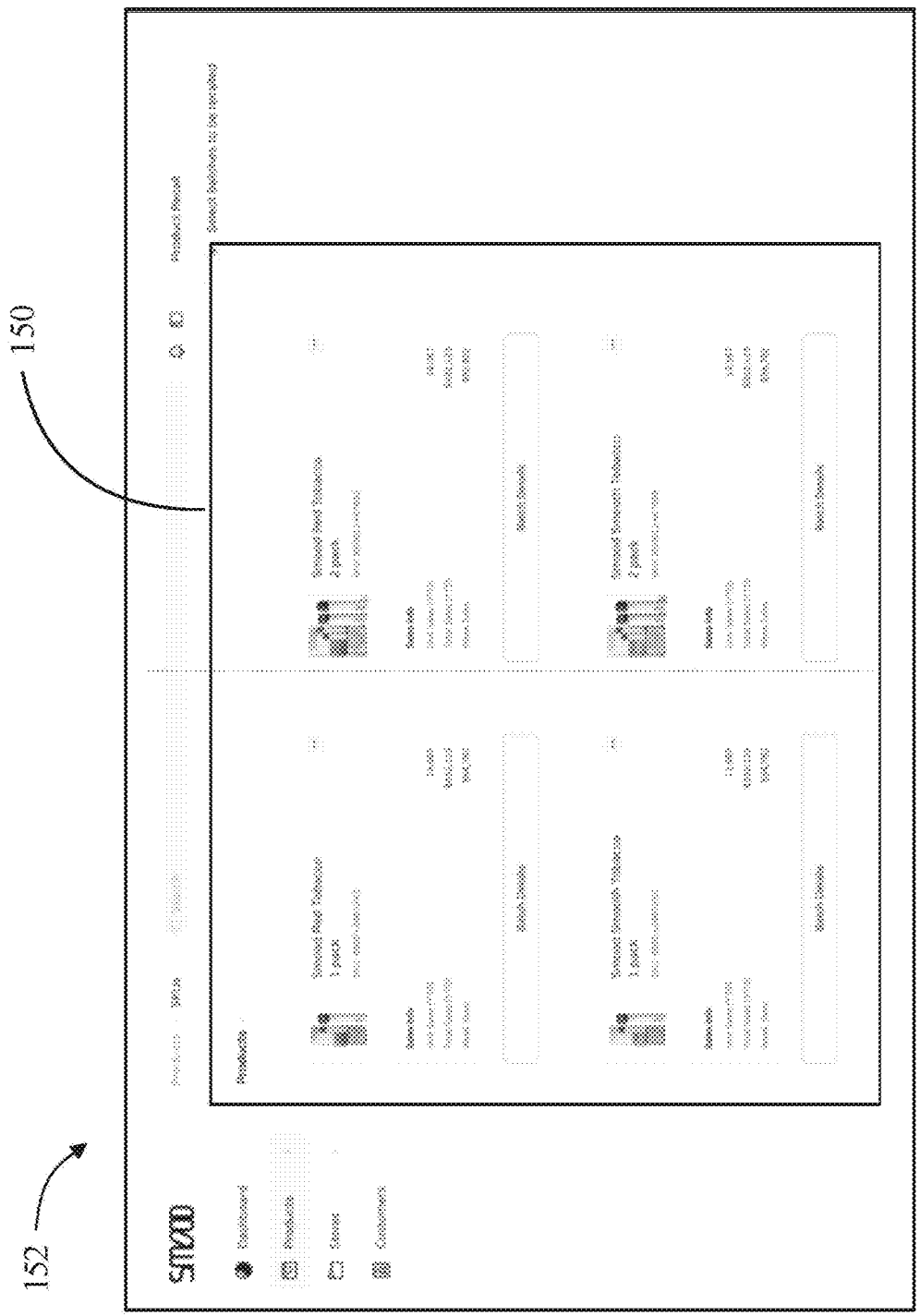
Figure 3C:
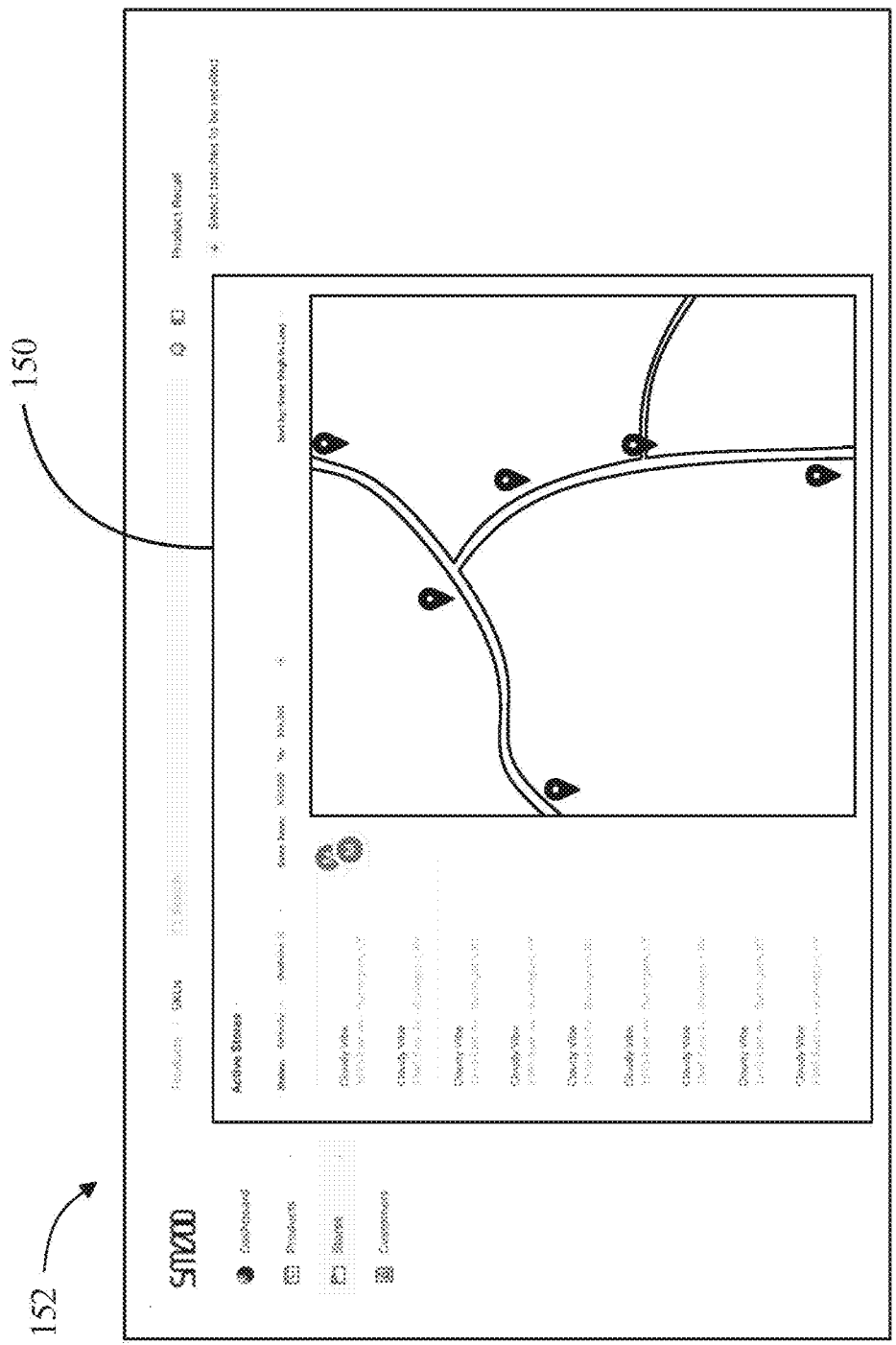
Figure 3D:
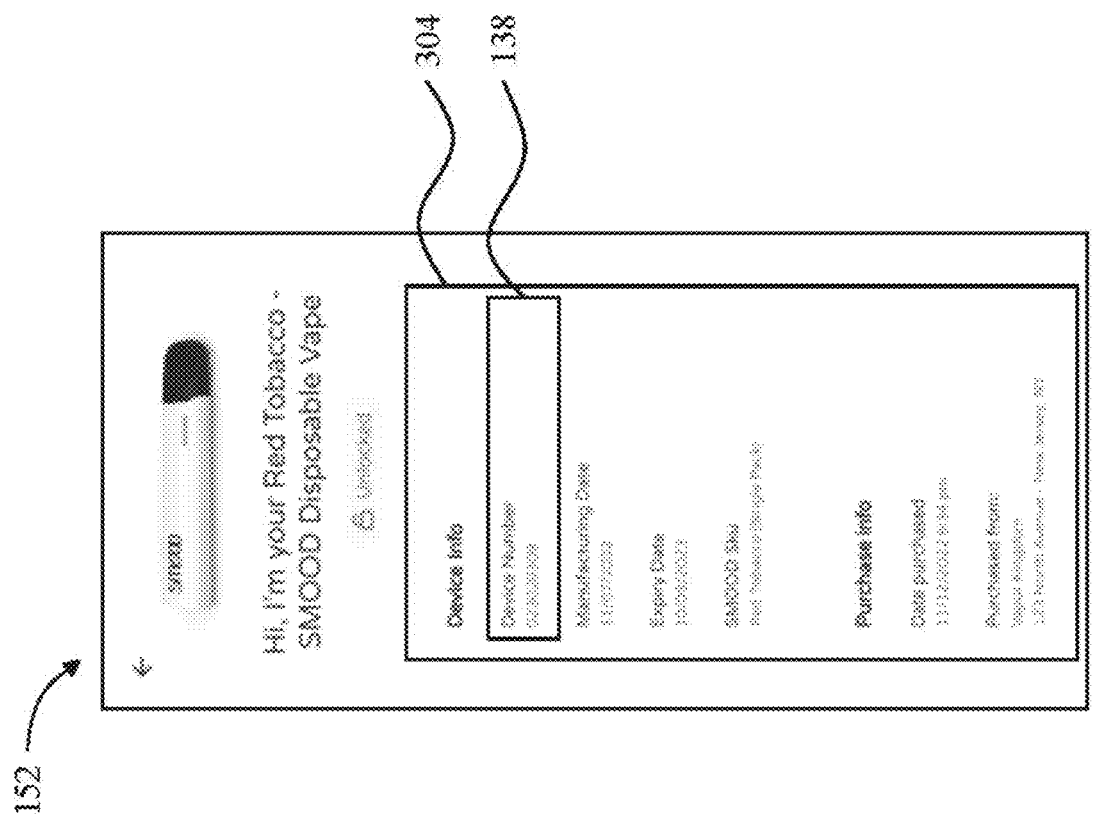
Figure 3G:
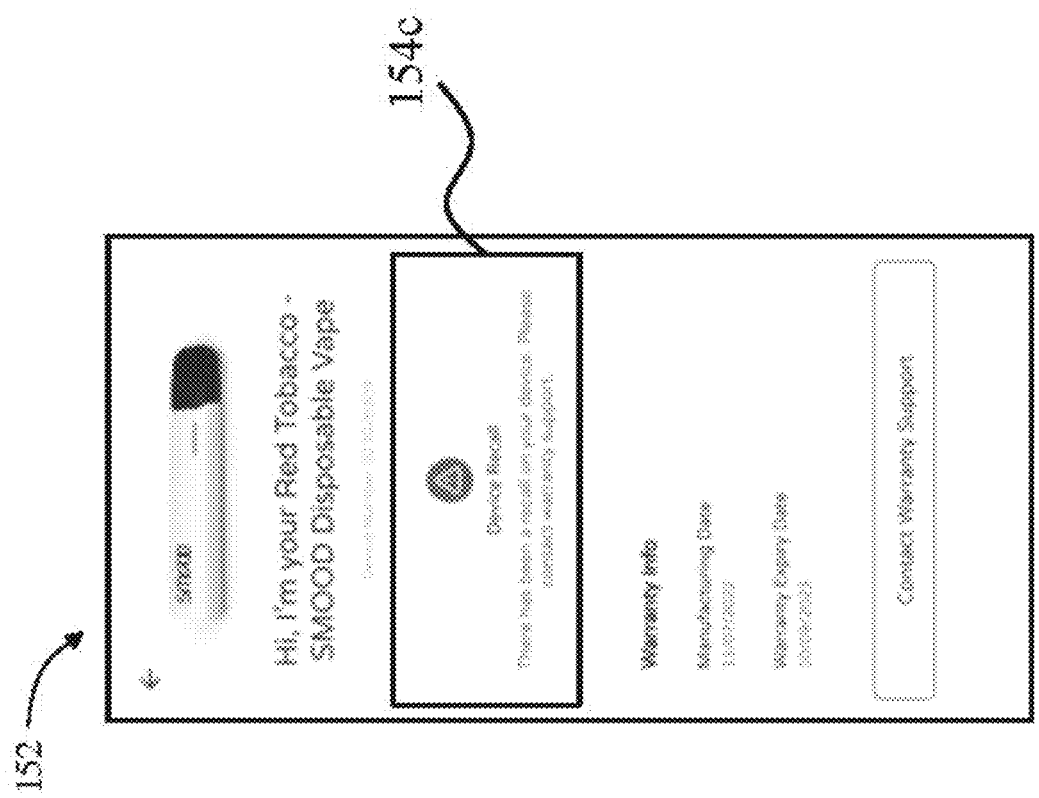

Referring now to FIG. 2, an exemplary embodiment of an object 200 containing an NFC tag 110 is illustrated. Object 200 may include any object described in this disclosure, such as, without limitation, an aerosol delivery device. In a non-limiting example, object 200 may be consistent with any apparatus described in U.S. patent application Ser. No. 18/211,706. In some embodiments, object 200 may include an outer body 204. As used in this disclosure, an "outer body" is a container configured to encapsulate a plurality of internal elements of object 200 described below. In a non-limiting example, NFC tag 110 of object 200 may be covered by outer body 204. NFC tag 110 may be disposed on the cartridge covered by outer body 204 as described in further detail below. In another non-limiting example, NFC tag 110 of object 200 may be disposed on the exterior of outer body 204; for instance, and without limitation, NFC tag 110 may be a sticker that is adhered to outer body 204. Outer body 204 may be constructed of any suitable material or combination of materials. For instance, and without limitation, outer body 204 may be constructed at least in part of metal, such as without limitation aluminum, steel, or the like. Outer body 204 may be constructed at least in part of plastic, such as without limitation polyvinyl chloride (PVC), high-density polyethylene (HDPE), acrylonitrile butadiene styrene (ABS), or the like. Outer body 204 may be composed at least in part of ceramic. Outer body 204 may be composed at least in part of composite material; as a non-limiting example, outer body 204 may be composed at least in part of fiberglass. Outer body 204 may be manufactured according to any suitable method or combination of methods, including without limitation casting, molding, subtractive processes such as machining, computer numerical control (CNC) machining, or the like, additive processes such as fused deposition printing, power-binder printing, selective laser sintering, stereolithography, or the like, lamination, coating, finishing, painting, polishing, engraving, anodization, assembly of parts through adhesion, engineering fits, fastening, fusing, or the like, or any combination thereof. Persons skilled in the art, upon reviewing the entirety of this disclosure, will be aware of various materials and/or material components usable to construct outer body 204 or other elements, components, and/or devices of object 200, as well as suitable methods or combinations of methods for manufacturing outer body 204, components of outer body 204, and/or any other elements, components, and/or devices of object 200 as consistent with the instant disclosure. Additionally, or alternatively, outer body 204 may include a variety of shapes. In some cases, outer body 204 may include a flat cylinder shape. In a non-limiting example, outer body 204 may be designed in a shape comparable to an actual cigarette. Further, outer body 204 may be detachable from object 200. In a non-limiting example, Outer body 204 may be detachable from the cartridge.

With continued reference to FIG. 2, object 200 may include a plurality of internal elements. As used in this disclosure, "internal elements" are components internal to object 200. In some embodiments, plurality of internal elements may include a power source. As used in this disclosure, a "power source" is an element configured to provide electric power to a circuit or device. In some cases, power source may be connected to a plurality of electronic device or components such as, without limitation, a processing circuit, a control circuit, and the like thereof. For instance, and without limitation, processing circuit and control circuit may include any processing circuit and control circuit described in U.S. patent application Ser. No. 18/211,706. Power source may include, without limitation, a battery containing one or more cell chemistries such as, without limitation, lithium cobalt oxide (LCO), lithium nickel cobalt aluminum oxide (NCA), lithium nickel manganese cobalt oxide (NMC), lithium iron phosphate (LFP), and the like; a power source may be rechargeable. In some embodiments, power source may be further configured to transmit electric power to other internal elements of object 200 which requires electricity to operate. In some cases, transmitting electric power may include using one or more continuous conductor. As used in this disclosure, a "continuous conductor" is an electrical conductor, without any interruption, made from electrically conducting material that is capable of carrying electrical current. Electrically conductive material may comprise copper for example. Electrically conductive material may include any material that is conductive to electrical current and may include, as a nonlimiting example, various metals such as copper, steel, or aluminum, carbon conducting materials, or any other suitable conductive material. In a non-limiting example, power source may transmit electric power through a continuous conductive wire to control circuit and/or processing circuit. Additionally, or alternatively, power source may be integrated and/or embedded within control circuit and/or processing circuit. In a non-limiting example, control circuit and/or processing circuit may be supplied by separate power sources. In other embodiments, control circuit and/or processing circuit may share a common power source. In a non-limiting example, power source may be remote to control circuit and/or processing circuit and transmit electric power through one or more continuous conductor to control circuit and/or processing circuit over a distance within object 200.

With continued reference to FIG. 2, In some embodiments, plurality of internal elements may include an aerosolizable material reservoir. As used in this disclosure, an "aerosolizable material reservoir" is a component of object 200 configured to hold an aerosolizable material. "Aerosolizable material," for the purpose of this disclosure, is a material that is capable for aerosolization, wherein the aerosolization is a process of intentionally oxidatively converting and suspending particles or a composition in a moving stream of air. Aerosolizable material may include one or more active ingredients and/or chemicals, including without limitation pharmaceutical chemicals, recreational chemicals, flavor-bearing chemicals, and the like. Chemicals may be extracted, without limitation, from plant material, and/or a botanical, such as tobacco or other herbs or blends. Chemicals may be in pure form and/or in combination or mixture with humectants that may or may not be mixed with plant material. In a non-limiting example, aerosolizable material may include E-cigarette liquid, wherein the E-cigarette liquid is a liquid solution or mixture used in aerosol delivery device such as, without limitation, an e-cigarette. In some cases, aerosolizable material may include a humectant, wherein the "humectant" may generally refer to as a substance that is used to keep things moist. Humectant may attract and retain moisture in the air by absorption, allowing the water to be used by other substances. Humectants are also commonly used in many tobaccos or botanicals and electronic vaporization products to keep products moist and as vapor-forming medium. Examples may include, without limitation, propylene glycol, sugar polyols such as glycerol, glycerin, honey and the like thereof. Continuing the non-limiting example, E-cigarette liquid may consist of a combination of propylene glycol and glycerin (95%), and flavorings, nicotine, and other additives (5%). In some embodiments, aerosolizable material held by aerosolizable material reservoir may be replaceable. In a non-limiting example, aerosolizable material reservoir may include a secondary container such as a liquid chamber, wherein the liquid chamber may contain a single type of aerosolizable material. Liquid chamber may be inserted into aerosolizable material reservoir; in other words, aerosolizable material may not be in direct contact with aerosolizable material reservoir. User of object 200 may switch from a first aerosolizable material to a second aerosolizable material by ejecting a first liquid chamber storing the first aerosolizable material from aerosolizable material reservoir and inserting a second liquid chamber storing the second aerosolizable material into aerosolizable material reservoir.

With continued reference to FIG. 2, in some embodiments, plurality of internal elements may include an aerosol generation mechanism. As used in this disclosure, an "aerosol generation mechanism" is a component of object 200 configured to generate aerosol using an aerosolizable material. Aerosol generation mechanism may be connected to the control circuit. In an embodiment, aerosol generation mechanism may be configured to convert any aerosolizable material into a vapor. "Vapor," for the purpose of this disclosure, refers to a substance that is in a gas phase at a temperature lower than its critical point. The vapor may be condensed to a liquid or to a solid by increasing its pressure without reducing the temperature. Vapor may include an aerosol, where "aerosol" may generally refer to a colloid of fine solid particles or liquid droplets in air or another gas. Examples of aerosols may include clouds, haze, and smoke, including the smoke from tobacco or botanical products. The liquid or solid particles in an aerosol may have varying diameters of average mass that may range from monodisperse aerosols, producible in the laboratory, and containing particles of uniform size: to polydisperse colloidal systems, exhibiting a range of particle sizes. As the sizes of these particles become larger, they have a greater settling speed which causes them to settle out of the aerosol faster, making the appearance of the aerosol less dense and to shorten the time in which the aerosol will linger in air. Interestingly, an aerosol with smaller particles will appear thicker or denser because it has more particles. Particle number has a much bigger impact on light scattering than particle size (at least for the considered ranges of particle size), thus allowing for a vapor cloud with more smaller particles to appear denser than a cloud having fewer, but larger particle sizes.

Still referring to FIG. 2, aerosol generation mechanism may include a heating element, which may include a resistive heater configured to thermally contact the aerosolizable material from aerosolizable material reservoir. Power source may provide electricity to heating element. In a non-limiting example, using heating element of aerosol generation mechanism for vaporization of aerosolizable material may be used as an alternative to burning (smoking) which may avoid inhalation of many irritating and/or toxic carcinogenic by-products which may result from pyrolytic processes of burning material such as, without limitation, tobacco or botanical products above 300 degrees C. Heating element may operate at a temperature at/or below 300 degrees C., configured by aerosol generation mechanism, controlled by control circuit. In a non-limiting example, aerosol generation mechanism may include an atomizer configured to heat aerosolizable material. As used in this disclosure, an "atomizer" is a device for emitting liquid, such as aerosolizable material, as a fine spray such as, without limitation, a vapor. An atomizer may include, without limitation, a small heating element that heats and/or vaporizes at least a portion of aerosolizable material and a wicking material that may draw a liquid aerosolizable material in to the atomizer; a wicking material may comprise silica fibers, cotton, ceramic, hemp, stainless steel mesh, and/or rope cables. A wicking material may be designed and/or configured to draw liquid aerosolizable material into atomizer without a pump or other mechanical moving part. A resistance wire may be wrapped around a wicking material and then connected to a positive and negative pole of a current source such as a power source as noted above; a resistance wire may include, without limitation, a coil, and when activated may have a temperature increase as a result of the current flowing through the resistive wire to generate heat. Heat may be transferred from heating element to aerosolizable material through conductive, convective, and/or radiative heat transfer such that aerosolizable material vaporizes. In another non-limiting example, as an alternative or additional element to the atomizer, aerosol generation mechanism may include a "cartomizer" to generate aerosol from the aerosolizable material for inhalation by the user of object 200. As used in this disclosure, a "cartomizer" is a combination of a cartridge and atomizer as described above. A cartomizer may include a heating element surrounded by a liquid-soaked poly-foam that acts as holder for aerosolizable material, which may include without limitation a liquid. In other embodiments, aerosol generation mechanism may not have an atomizer or cartomizer, but may include an oven instead, which may be at least partially closed, An "oven," for the purpose of this disclosure, is a component configured to heat confined substances, such as, without limitation, aerosolizable material. Oven may have a closable opening. oven may be wrapped with heating element or may be in thermal communication with a heating element by means of another mechanism. Aerosolizable material may be placed directly in an oven or in a liquid chamber fitted in the oven. A heating element in thermal communication with the oven may heat aerosolizable material mass in order to create a gas phase vapor, including without limitation through conductive, convective, and/or radiative heat transfer. Vapor may be released to a vaporization chamber where gas phase vapor may condense, forming an aerosol cloud having typical liquid vapor particles with particles having a diameter of average mass of approximately 1 micron or greater. In some cases, the diameter of average mass may be approximately 0.1-1 micron.

With continued reference to FIG. 2, object 200 may include a mouthpiece 208 at a first end of outer body 204. In some embodiments, mouthpiece 208 may be located on an opposite end to bottom 208 at a second end of outer body 204. Mouthpiece 204 may be an element of object 200 through which a user inhales vapor as described below. In some embodiments, mouthpiece 208 may include an aperture through which vapor is drawn when a user inhales, a passage through which vapor passes to the aperture, one or more inlets to permit passage of air through mouthpiece 208, and/or any other suitable feature. Mouthpiece 204 may be tapered or otherwise shaped to fit in a user's mouth with ease and comfort. In a non-limiting example, air may be drawn into aerosol generation mechanism to carry the vaporized aerosol away from heating element, where it then cools and condenses to form liquid particles suspended in air, which may then be drawn out of mouthpiece 208 by the user of object 200. Additionally, or alternatively, object 200 may include an air hole, wherein the air hole is a hole or passage that allows air to pass through object 200. In an embodiment, fresh air may be allowed to enter object 200 when the heating element is on. Vaporization of aerosolizable material may occur at lower temperatures in aerosol generation mechanism compared to temperatures required to generate an inhalable vapor in an actual cigarette. Actual cigarette may be a device in which a smokable material is burned to generate an inhalable vapor. The lower temperature of aerosol generation mechanism may result in less decomposition and/or reaction of aerosolizable material, and therefore produce an aerosol with many fewer chemical components compared to actual cigarette. In some cases, aerosol generation mechanism may generate aerosol with fewer chemical components that may be harmful to human health compared to actual cigarette.

With continued reference to FIG. 2, in a non-limiting example, bottom 212 of outer body 204 may include a charging connector 216, wherein the charging connector 216 may include any circuit or circuit element by means of which electric power may be transferred from an external power source to power source, as described above. For instance, and without limitation, charging connector 216 may include an inductive charging coil whereby electrical power is transferred to the inductive charging coil using a varying exterior magnetic field supplied by another device or a conductive connection from the object 200 to an exterior device. A non-limiting example of a conductive connection may include two or more charge contacts, which may be constructed of conductive material and accessible from an exterior surface of outer body 204, such as, without limitation, bottom 212. Charge contacts may be in electrical communication with power source inside of outer body 204; charge contact pins may be visible on the exterior of outer body 204. When object 200 is connected to an external power source, charging pins may facilitate electrical communication between the power source inside of object 200 and the external power source. Charging pins may be electrically connected to power source via any suitable connection; for instance, and without limitation, charging pins may contact one or more conductive elements including springs, clips, and/or a printed circuit board (PCB). Charging pins may include male and/or female connectors; for instance, charging pins may include a "plug" that projects from bottom 212 of outer body 204 or may include holes into which a plug or one or more projecting conducting pins may be inserted. Additionally, or alternatively, charging connector 216 on bottom 212 may include a magnetic contact.

With continued reference to FIG. 2, in some embodiments, object 200 may include an end-cap 220. As used in this disclosure, an "end-cap" is a removable cover element that covers an end of outer body 204. In a non-limiting example, end-cap 220 may close off mouthpiece 208 at first end of outer body 204. End-cap 216 may be attached to outer body 204 in any suitable manner, including without limitation a press-fit, snap fit, adhesion, fusion, fastening, or the like; end-cap 220 may be formed as an integral portion of outer body 204.

With continued reference to FIG. 2, in some embodiments, a status indicator 224 may be disposed on any surface of outer body 204. As used in this disclosure, a "status indicator" is an element that continuously indicates one or more status of object 200. Status of object 200 may include, without limitation, internal state of processing circuit, state of power source, state of aerosol generation mechanism and the like, as described above. In some embodiments, status indicator 224 may include a passive status indicator, wherein the passive status indicator may be a status indicator 224 with physical configurations on outer body 204 which enables one or more indications of current apparatus state. In a non-limiting example, passive status indicator may be disposed on a surface of outer body 204 with a portion of the surface is transparent and/or hollow. User may observe one or more internal elements encapsulated by outer body 204 through such portion of the surface (i.e., passive status indicator) to know status of object 200. For instance, and without limitation, user may acknowledge amount of aerosolizable material remaining through a passive status indicator disposed on the surface of outer body 204 that right above aerosolizable material reservoir. In other embodiments, status indicator 224 may include an active status indicator, wherein the active status indicator may be a status indicator 224 with electrical configurations inside outer body 204 which enables one or more indications of current apparatus state. In a non-limiting example, active status indicator may include an indicator light located on outer body 204. Indicator light may include any light-emitting electronic component, including without limitation a light-emitting diode (LED). Active status indicator may indicate, without limitation, a charging status of object 200; for instance, and without limitation, indicator light of active status indicator may emit light while the object 200 is charging, and cease illumination when charging is complete. Indicator light of active status indicator may emit a first color of light while charging is occurring and a second when charging is complete, may blink to indicate charging is currently occurring, or the like. Any suitable pattern of illumination in response to charging status of object 200 may be used. In another non-limiting example, active status indicator may indicate object action datum 152, as described above. Indicator light of active status indicator may emit, without limitation, color "green" when control circuit is enabled, and color "red" when control circuit is disabled.

Referring now to FIG. 3A-C, screenshots of an exemplary embodiment of a visual interface 152 including object transaction analysis 150 are shown. Object transaction analysis 150 may include any object transaction analysis and elements thereof as described above in reference to FIG. 1. In some embodiments, as shown in FIG. 3A, object transaction analysis 150 may include statistical information related to sale of a selected object such as, without limitation, revenue, units sold, active stores, unique purchases. Object transaction analysis 150 may include one or more visualization of data listed above such as, without limitation, a line graph depicting total revenue of the selected object of previous week, a bar graph depicting an overview of sales of selected object by SKU number. In some embodiments, as shown in FIG. 3B, object transaction analysis 150 may include statistical information related to sale of each object of a plurality of objects such as, without limitation, unit sales (YTD), total sales (YTD), week sales, and the like. In other embodiments, as shown in FIG. 3C, object transaction analysis 150 may include statistical information related to sale of a selected object by a plurality of retailers, such as, without limitation, a map showing locations of the plurality of retailers, and the like. Object transaction analysis 152 may promote tracking inventory and rate of sales.

Referring now to FIG. 3D, a screenshot of an exemplary embodiment of a visual interface 152 including identification data 304 containing unique ID 138 associated to an object is shown. Identification data 304 may include any identification data described above in reference to FIG. 1. In some embodiments, identification data 304 may include unique ID 138, manufacturing date, expiry date, SKU, and/or purchase info (e.g., date purchased, purchased from, and the like). Unique ID 138 may include any unique ID described above in reference to FIG. 1.

Referring now to FIG. 3E-F, screenshots of an exemplary embodiment of a visual interface 152 including object action datum 154_a_-_b_ are shown. Object action datum 154_a_-_b_ may include any object action datum described above in reference to FIG. 1. In some embodiments, as shown in FIG. 3E, an object such as object 200 may include an object action datum 154_a_ of "unlocked" determined and transmitted by processor 102 to NFC tag 110 within object 200. In this case, object 200 may be able to perform all functionalities of object 200 such as, without limitation, powering on/off, initiating/terminating vaporization of aerosolizable material, configuring aerosol generation mechanism (i.e., adjusting temperature), changing aerosolizable material, and the like thereof. In other embodiments, as shown in FIG. 3F, an object such as object 200 may include an object action datum 154_b_ of "locked" determined and transmitted by processor 102 to NFC tag 110 within object 200. In this case, object 200 may be unable to perform one or more functions of object 200 listed above.

Referring now to FIG. 3.G, a screenshot of an exemplary embodiment of a visual interface 152 including object action datum 154_c_ is shown. In some embodiments, an object such as object 200 may include an object action datum 154_c_ of "device recall." Object action datum 154_c_ may be determined by an entity such as, without limitation, manufacturer of object 200. Object action datum 154_c_ may be transmitted by processor 102 to NFC tag 110 within object 200. In this case, user of object 200 may be notified by a recall message: "there has been a recall on your device. Please contact warranty support."

Referring now to FIG. 4, an exemplary embodiment of an immutable sequential listing 400 is illustrated. Data elements are listed in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 404 may describe the transfer of a physical good; for instance, a digitally signed assertion 404 may describe the sale of an object. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Figure 4:
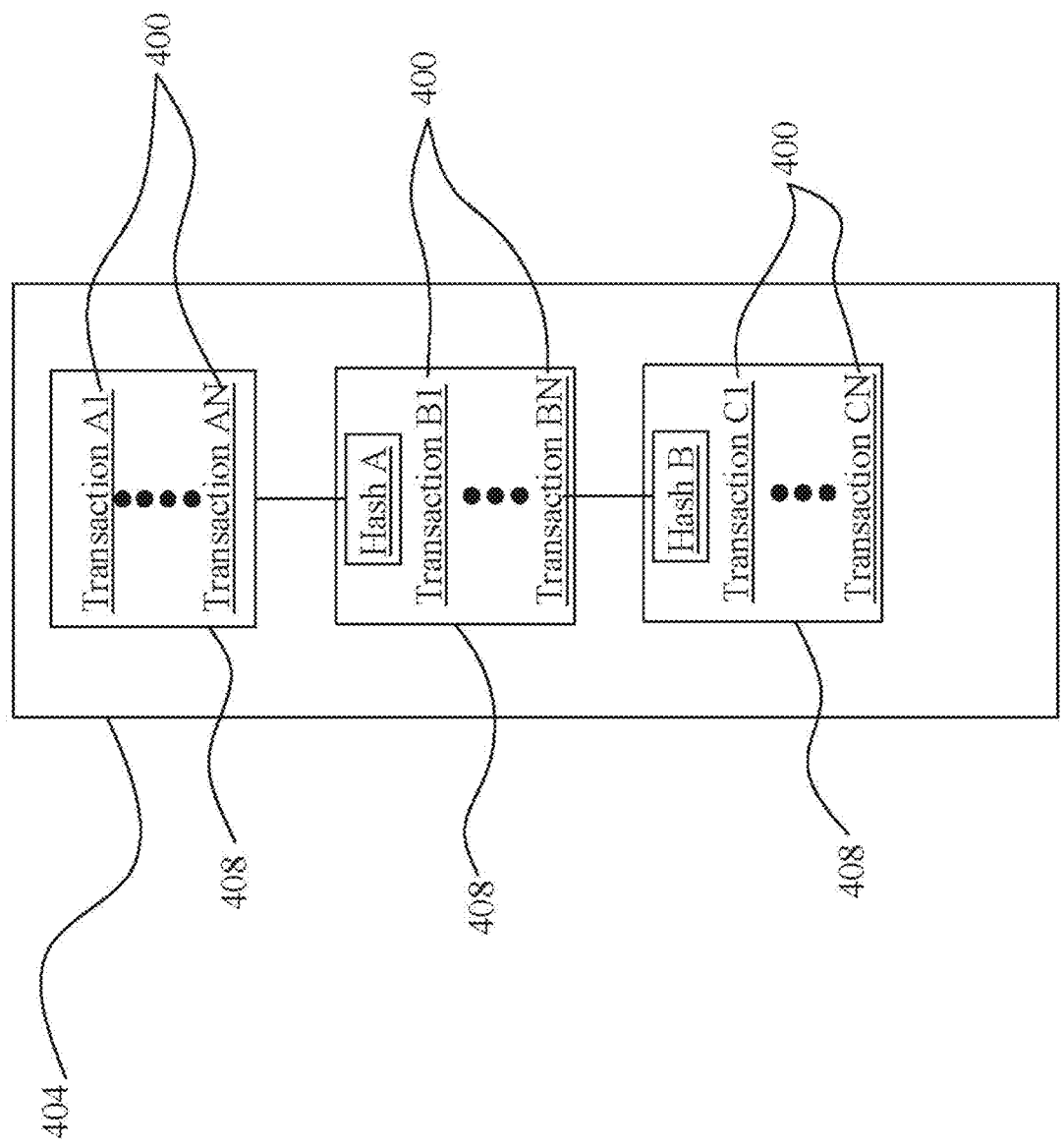
FIG. 4 is an exemplary embodiment of an immutable sequential listing.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.94 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block."

An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 4, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 408 in a block chain computationally challenging; the incentive for producing sub-listings 408 may include the grant of new crypto-currency to the miners. Quantities of crypto-currency may be exchanged using at least a posted content as described above.

Figure 5:
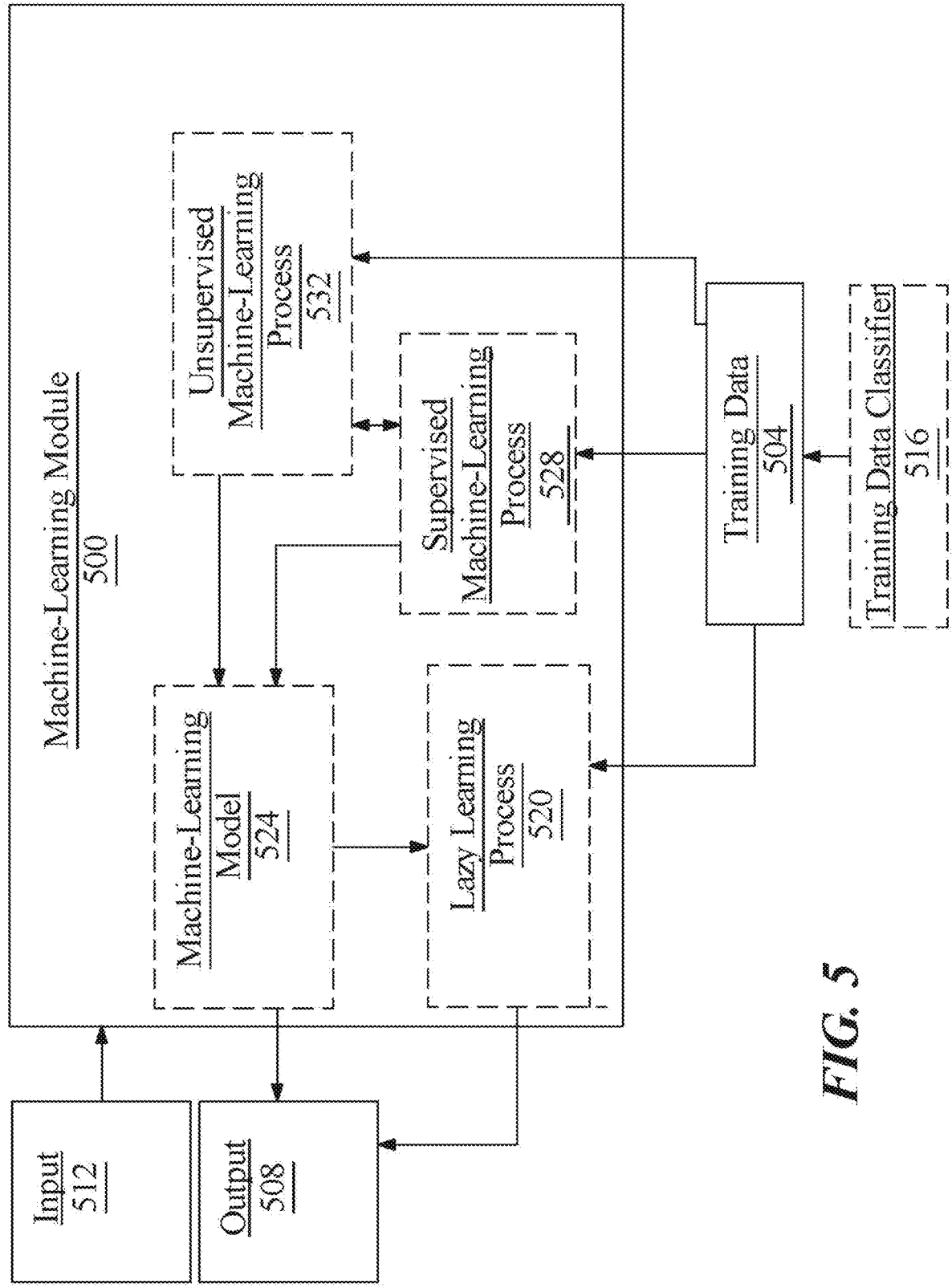
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
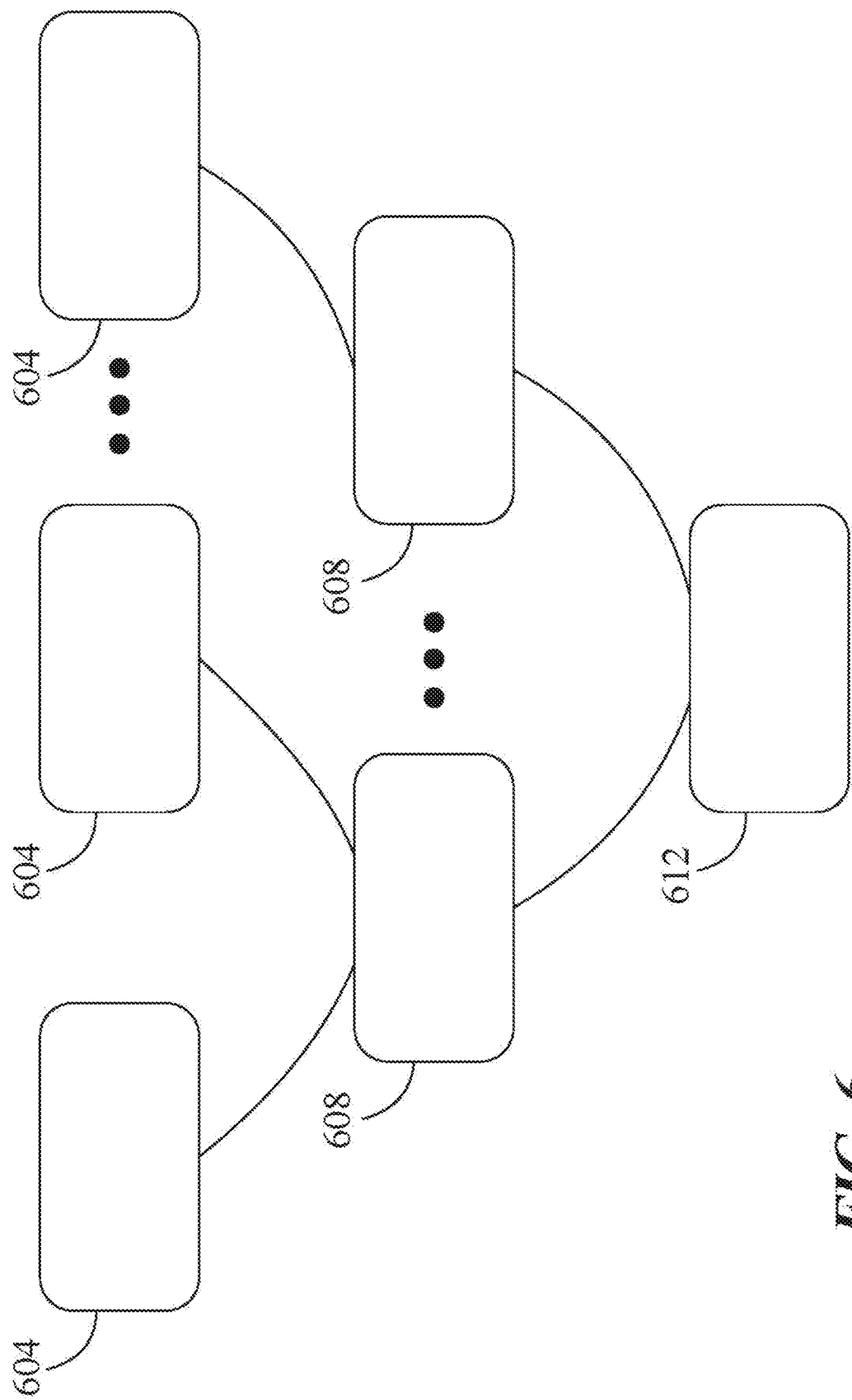
FIG. 6 is an exemplary embodiment of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6, cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively, or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups, this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P Q, R, S, the point, P needs to be added as many times to itself to result in Q as R needs to be added as many times to itself to result in S, can be computed efficiently for certain elliptic curves.

Figure 7:
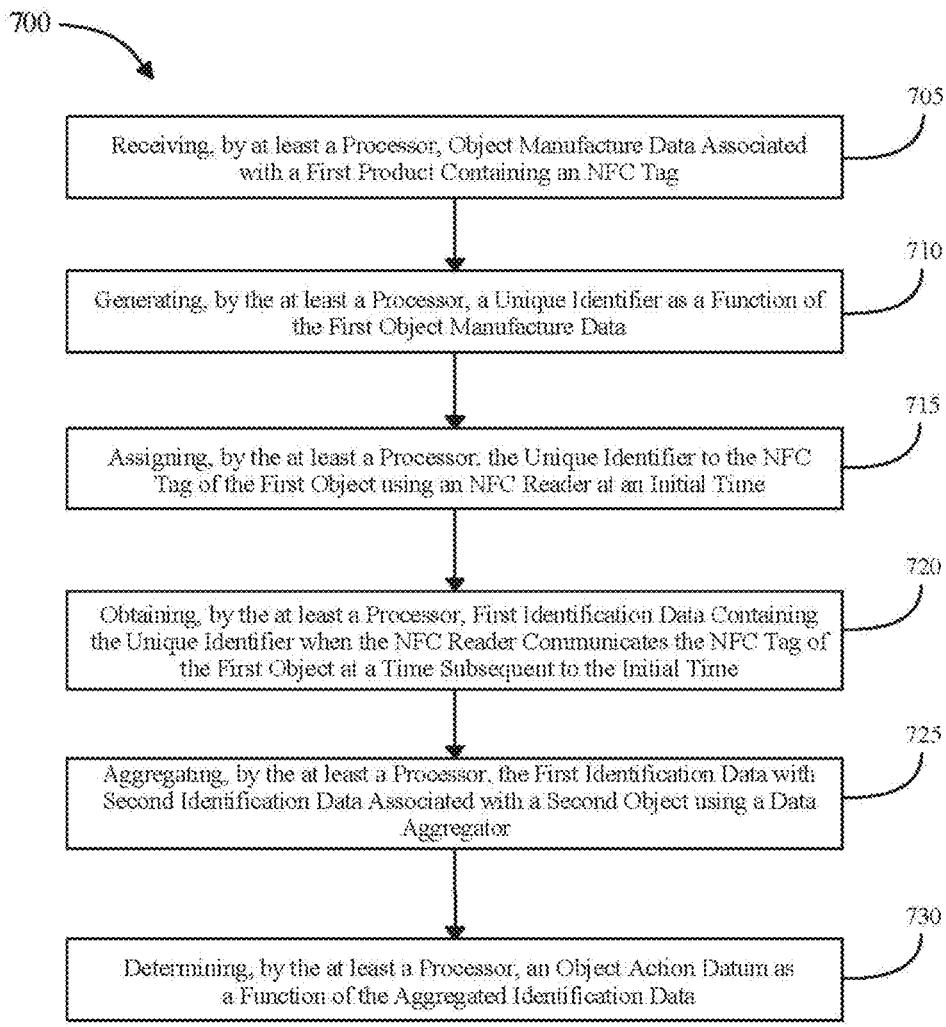
FIG. 7 is a flow diagram of an exemplary method for unique identification of an object using near-flied communication (NFC)

Now referring to FIG. 7, a flow diagram of an exemplary method 700 for unique identification of an object using near-field communication (NFC) is shown. Method 700 includes a step 705 of receiving, by at least a processor, object manufacture data associated with a first object containing an NFC tag. This may be implemented, without limitation, as described above in reference to FIGS. 1-6. In some embodiments, object manufacture data may include a plurality of object component data, wherein each object component datum of the plurality of object component data may include an object component identifier associated with an object component descriptor. In some embodiments, object manufacture data may include a plurality of object process data, wherein each object process datum of the plurality of object process data may include an object process identifier associated with an object process descriptor. In other embodiments, object manufacture data may include a plurality of object instrument data, wherein each object instrument datum of the plurality of object instrument data may include an object instrument identifier associated with an object instrument descriptor. Additionally, or alternatively, NFC tag may include an NFC chip configured to communicate with the NFC reader, and an antenna communicatively connected to the NFC chip. Further, NFC tag may include an NFC tag type. This may be implemented, without limitation, as described above in reference to FIGS. 1-6.

With continued reference to FIG. 7, method 700 includes a step 710 of generating, by the at least a processor, a unique identifier as a function of the object manufacture data. This may be implemented, without limitation, as described above in reference to FIGS. 1-6.

With continued reference to FIG. 7, method 700 includes a step 715 of assigning, by the at least a processor, the unique identifier to the NFC tag of the first object using an NFC reader at an initial time. This may be implemented, without limitation, as described above in reference to FIGS. 1-6.

With continued reference to FIG. 7, method 700 includes a step 720 of obtaining, by the at least a processor, first identification data containing the unique identifier when the NFC reader communicates with the NFC tag of the first object at a subsequent to the initial time, wherein the subsequent time occurs temporally after the initial time. This may be implemented, without limitation, as described above in reference to FIGS. 1-6. In some embodiments, obtaining the first identification data may include obtaining user metadata from a user of the first object. This may be implemented, without limitation, as described above in reference to FIGS. 1-6.

With continued reference to FIG. 7, method 700 includes a step 725 of aggregating, by the at least a processor, the first identification data with second identification data associated with a second object using a data aggregator. This may be implemented, without limitation, as described above in reference to FIGS. 1-6. In some embodiments, aggregating the first identification data with the second identification data may include generating an object transaction analysis as a function of the aggregated identification data. In other embodiments, aggregating the first identification data with the second identification data may include displaying the object transaction analysis through a visual interface. This may be implemented, without limitation, as described above in reference to FIGS. 1-6.

With continued reference to FIG. 7, method 700 includes a step 730 of determining, by the at least a processor, an object action datum as a function of the aggregated identification data. This may be implemented, without limitation, as described above in reference to FIGS. 1-6. In some embodiments, determining the object action datum may include verifying the first identification data, generating a verification datum as a function of the first identification data, and determining the objection action datum as a function of the verification datum. This may be implemented, without limitation, as described above in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
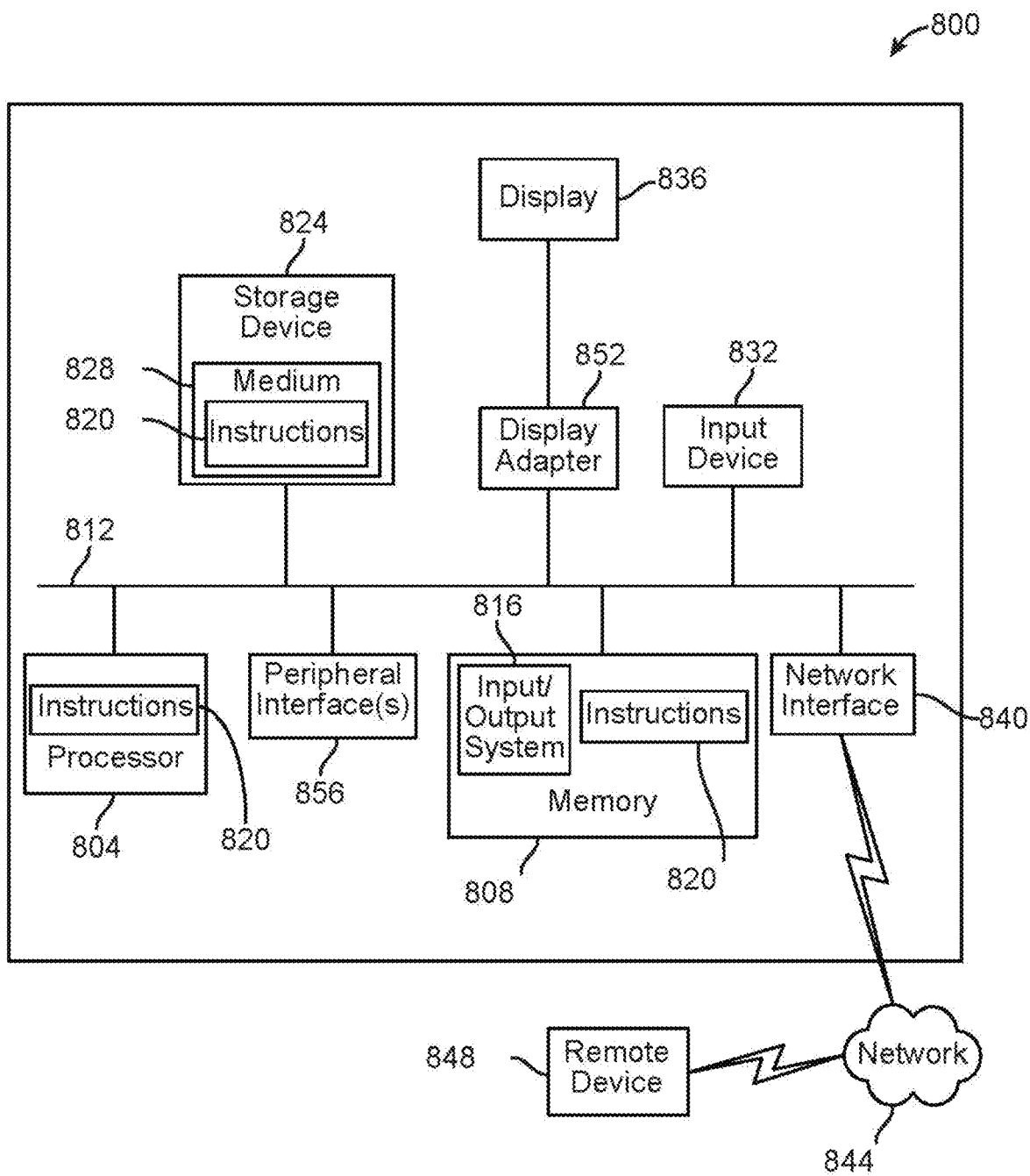
FIG. 8 is a block diagram of a computing system that can be used to implement any one or more of the methodologies disclosed herein and any one or more portions thereof. The drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for unique identification of an object using near-field communication (NFC), the apparatus comprising:
    at least a processor; and
    a memory communicatively connected to the at least a processor, wherein the memory contains instructions configuring the at least a processor to:
        receive object manufacture data associated with a first object, wherein the first object contains an NFC tag;
        generate a unique identifier as a function of the object manufacture data;
        assign the unique identifier to the NFC tag of the first object using an NFC reader at an initial time;
        obtain first identification data containing the unique identifier when the NFC reader communicates with the NFC tag of the first object at a subsequent time, wherein the subsequent time occurs temporally after the initial time;
        aggregate the first identification data with second identification data associated with a second object using a data aggregator comprising a machine learning model configured to generate an object transaction analysis; and
        determine an object action datum as a function of the object transaction analysis.

2. The apparatus of claim 1, wherein the object manufacture data comprises:
    a plurality of object component data, wherein each object component datum of the plurality of object component data comprises:
    an object component identifier associated with an object component descriptor.

3. The apparatus of claim 1, wherein the object manufacture data comprises:
    a plurality of object process data, wherein each object process datum of the plurality of object process data comprises:
    an object process identifier associated with an object process descriptor.

4. The apparatus of claim 1, wherein the object manufacture data comprises:
    a plurality of object instrument data, wherein each object instrument datum of the plurality of object instrument data comprises:
    an object instrument identifier associated with an object instrument descriptor.

5. The apparatus of claim 1, wherein the NFC tag comprises an NFC tag type.

6. The apparatus of claim 5, wherein the NFC tag type comprises a passive high frequency (HF) radio frequency identification (RFID) tag.

7. The apparatus of claim 1, wherein the NFC tag comprises:
    an NFC chip configured to communicate with the NFC reader; and
    an antenna communicatively connected to the NFC chip.

8. The apparatus of claim 1, wherein obtaining the first identification data comprises:
    obtaining user metadata from a user of the first object.

9. The apparatus of claim 1, wherein aggregating the first identification data with second identification data further comprises displaying the object transaction analysis using a visual interface.

10. The apparatus of claim 1, wherein determining the object action datum comprises:
    verifying the first identification data;
    generating a verification datum as a function of the first identification data; and
    determining the object action datum as a function of the verification datum.

11. A method for unique identification of an object using near-field communication (NFC), the method comprising:
    receiving, by at least a processor, object manufacture data associated with a first object, wherein the first object contains an NFC tag;
    generating, by the at least a processor, a unique identifier as a function of the object manufacture data;
    assigning, by the at least a processor, the unique identifier to the NFC tag of the first object using an NFC reader at an initial time;
    obtaining, by the at least a processor, first identification data containing the unique identifier when the NFC reader communicates with the NFC tag of the first object at a subsequent time, wherein the subsequent time occurs temporally after the initial time;
    aggregating, by the at least a processor, the first identification data with second identification data associated with a second object using a data aggregator comprising a machine learning model configured to generate an object transaction analysis; and
    determining, by the at least a processor, an object action datum as a function of the object transaction analysis.

12. The method of claim 11, wherein the object manufacture data comprises:
    a plurality of object component data, wherein each object component datum of the plurality of object component data comprises:
    an object component identifier associated with an object component descriptor.

13. The method of claim 11, wherein the object manufacture data comprises:

a plurality of object process data, wherein each object process datum of the plurality of object process data comprises:

an object process identifier associated with an object process descriptor.

14. The method of claim 11, wherein the object manufacture data comprises:

a plurality of object instrument data, wherein each object instrument datum of the plurality of object instrument data comprises:

an object instrument identifier associated with an object instrument descriptor.

15. The method of claim 11, wherein the NFC tag comprises an NFC tag type.

16. The apparatus of claim 15, wherein the NFC tag type comprises a passive high frequency (HF) radio frequency identification (RFID) tag.

17. The method of claim 11, wherein the NFC tag comprises:

an NFC chip configured to communicate with the NFC reader; and an antenna communicatively connected to the NFC chip.

18. The method of claim 11, wherein obtaining the first identification data comprises:

obtaining user metadata from a user of the first object.

19. The method of claim 11, wherein aggregating the first identification data with second identification data further comprises displaying the object transaction analysis using a visual interface.

20. The method of claim 11, wherein determining the object action datum comprises:

verifying the first identification data;

generating a verification datum as a function of the first identification data; and determining the object action datum as a function of the verification datum.

* * * * *